US008433075B2

(12) United States Patent
Elko et al.

(10) Patent No.: US 8,433,075 B2
(45) Date of Patent: *Apr. 30, 2013

(54) AUDIO SYSTEM BASED ON AT LEAST SECOND-ORDER EIGENBEAMS

(75) Inventors: Gary W. Elko, Summit, NJ (US); Robert A. Kubli, Scotch Plains, NJ (US); Jens M. Meyer, New York, NY (US)

(73) Assignee: MH Acoustics LLC, Summit, NJ (US)

( * ) Notice: Subject to any disclaimer, the term of this patent is extended or adjusted under 35 U.S.C. 154(b) by 821 days.

This patent is subject to a terminal disclaimer.

(21) Appl. No.: 12/501,741

(22) Filed: Jul. 13, 2009

(65) Prior Publication Data

US 2010/0008517 A1 Jan. 14, 2010

Related U.S. Application Data

(63) Continuation of application No. 10/500,938, filed as application No. PCT/US03/00741 on Jan. 10, 2003, now Pat. No. 7,587,054.

(60) Provisional application No. 60/347,656, filed on Jan. 11, 2002.

(51) Int. Cl.
*H04R 3/00* (2006.01)
*G06F 17/00* (2006.01)

(52) U.S. Cl.
USPC ................................................ 381/92; 700/94

(58) Field of Classification Search .................... 381/92, 381/17, 18, 98, 61, 63; 700/94; 367/119
See application file for complete search history.

(56) References Cited

U.S. PATENT DOCUMENTS

| | | | | |
|---|---|---|---|---|
| 4,042,779 | A | 8/1977 | Craven et al. | 179/1 DM |
| 5,288,955 | A | 2/1994 | Staple et al. | 181/158 |

(Continued)

FOREIGN PATENT DOCUMENTS

| | | | |
|---|---|---|---|
| EP | 0 381 498 | A | 8/1990 |
| EP | 0 869 697 | A | 7/1997 |

(Continued)

OTHER PUBLICATIONS

Jérome Daniel, "Représentation de champs acoustiques, application à la transmission et àla reproduction des scènes sonores complexes dans un contexte multimédia," Ph.D. Thesis (2000), pp. 149-204, XP007909831.

(Continued)

*Primary Examiner* — Ping Lee

(74) *Attorney, Agent, or Firm* — Mendelsohn, Drucker & Associates, P.C.; Steve Mendelsohn

(57) ABSTRACT

A microphone array-based audio system that supports representations of auditory scenes using second-order (or higher) harmonic expansions based on the audio signals generated by the microphone array. In one embodiment, a plurality of audio sensors are mounted on the surface of an acoustically rigid sphere. The number and location of the audio sensors on the sphere are designed to enable the audio signals generated by those sensors to be decomposed into a set of eigenbeams having at least one eigenbeam of order two (or higher). Beamforming (e.g., steering, weighting, and summing) can then be applied to the resulting eigenbeam outputs to generate one or more channels of audio signals that can be utilized to accurately render an auditory scene. Alternative embodiments include using shapes other than spheres, using acoustically soft spheres and/or positioning audio sensors in two or more concentric patterns.

24 Claims, 27 Drawing Sheets

U.S. PATENT DOCUMENTS

| | | | | |
|---|---|---|---|---|
| 6,041,127 | A | 3/2000 | Elko | 381/92 |
| 6,072,878 | A | 6/2000 | Moorer | 381/18 |
| 6,239,348 | B1 | 5/2001 | Metcalf | 84/723 |
| 6,317,501 | B1 | 11/2001 | Matsuo | 381/92 |
| 6,526,147 | B1 | 2/2003 | Rung | 381/92 |
| 6,845,163 | B1 | 1/2005 | Johnston et al. | 381/92 |
| 6,904,152 | B1 | 6/2005 | Moorer | 381/18 |
| 2003/0147539 | A1 | 8/2003 | Elko et al. | |
| 2005/0195988 | A1 | 9/2005 | Tashev et al. | |

FOREIGN PATENT DOCUMENTS

| | | | |
|---|---|---|---|
| EP | 1 571 875 | A2 | 9/2005 |
| JP | 11 168792 | | 6/1999 |
| WO | WO 95/29479 | | 11/1995 |
| WO | WO 01/58209 | A1 | 8/2001 |
| WO | WO 03/061336 | A1 | 7/2003 |

OTHER PUBLICATIONS

Notification of Transmittal of the International Search Report or the Declaration; Mailed on Jun. 3, 2003 for corresponding PCT Application No. PCT/US03/00741 filed on Jan. 10, 2003; 7 pages.

Non-Final Office Action; Mailed on Feb. 8, 2007 for corresponding U.S. Appl. No. 10/500,938, filed Jul. 8, 2004; 7 pages.

Final Office Acton; Mailed on Jul. 17, 2007 for corresponding U.S. Appl. No. 10/500,938, filed Jul. 8, 2004; 11 pages.

Non-Final Office Action; Mailed on Feb. 7, 2008 for corresponding U.S. Appl. No. 10/500,938, filed Jul. 8, 2004; 13 pages.

Non-Final Office Action; Mailed on Oct. 3, 2008 for corresponding U.S. Appl. No. 10/500,938, filed Jul. 8, 2004; 12 pages.

Final Office Action; Mailed on Apr. 14, 2009 for corresponding U.S. Appl. No. 10/500,938, filed Jul. 8, 2004; 6 pages.

Notice of Allowance and Fees Due; Mailed on Jun. 8, 2009 for corresponding U.S. Appl. No. 10/500,938, filed Jul. 8, 2004; 7 pages.

P.M. Morse, K. U. Ingard: "Theoretical Acoustics" 1986, Princeton University Press, Princeton (New Jersey), ISBN: 0-691-02401-4, pp. 332-356, XP007906606.

Meyer Jens: "Beamforming for a Circular Microphone Array Mounted on Spherically Shaped Objects" Journal of the Acoustical Society of America, AIP/Acoustical Society of America, Melville, NY, US, Bd. 109, Nr. 1, Jan. 1, 2001, pp. 185-193, XP012002081, ISSN: 0001-4966.

Nelson, P. A. et al., "Spherical Harmonics, Singular-Value Decompositon and the Head-Related Transfer Function", Journal of Sound and Vibration (2001) 239(4), p. 607-637.

*FIG. 9*

| AZIMUTH | ELEVATION | (RADIUS) |
|---|---|---|
| 180 | 0.0 | 1.016 |
| 0 | 63.4 | 1.016 |
| 72 | 63.4 | 1.016 |
| 144 | 63.4 | 1.016 |
| 216 | 63.4 | 1.016 |
| −72 | 63.4 | 1.016 |
| 36 | 116.6 | 1.016 |
| 108 | 116.6 | 1.016 |
| 180 | 116.6 | 1.016 |
| 252 | 116.6 | 1.016 |
| −36 | 116.6 | 1.016 |
| 0 | 180.0 | 1.016 |
| −36 | 37.4 | 0.99 |
| 36 | 37.4 | 0.99 |
| 108 | 37.4 | 0.99 |
| 180 | 37.4 | 0.99 |
| 252 | 37.4 | 0.99 |
| −72 | 142.6 | 0.99 |
| 216 | 142.6 | 0.99 |
| 144 | 142.6 | 0.99 |
| 72 | 142.6 | 0.99 |
| 0 | 142.6 | 0.99 |
| 36 | 79.2 | 0.99 |
| 72 | 100.8 | 0.99 |
| 108 | 79.2 | 0.99 |
| 144 | 100.8 | 0.99 |
| 180 | 79.2 | 0.99 |
| 216 | 100.8 | 0.99 |
| 252 | 79.2 | 0.99 |
| −72 | 100.8 | 0.99 |
| −36 | 79.2 | 0.99 |
| 0 | 100.8 | 0.99 |

AUDIO SYSTEM BASED ON AT LEAST SECOND-ORDER EIGENBEAMS

CROSS-REFERENCE TO RELATED APPLICATIONS

This application is a continuation of U.S. patent application Ser. No. 10/500,938 filed on Jul. 8, 2004, which is a 371 of PCT/US03/00741 filed on Jan. 10, 2003, which claims the benefit of the filing date of U.S. provisional application No. 60/347,656, filed on Jan. 11, 2002.

BACKGROUND OF THE INVENTION

1. Field of the Invention

The present invention relates to acoustics, and, in particular, to microphone arrays.

2. Description of the Related Art

A microphone array-based audio system typically comprises two units: an arrangement of (a) two or more microphones (i.e., transducers that convert acoustic signals (i.e., sounds) into electrical audio signals) and (b) a beamformer that combines the audio signals generated by the microphones to form an auditory scene representative of at least a portion of the acoustic sound field. This combination enables picking up acoustic signals dependent on their direction of propagation. As such, microphone arrays are sometimes also referred to as spatial filters. Their advantage over conventional directional microphones, such as shotgun microphones, is their high flexibility due to the degrees of freedom offered by the plurality of microphones and the processing of the associated beamformer. The directional pattern of a microphone array can be varied over a wide range. This enables, for example, steering the look direction, adapting the pattern according to the actual acoustic situation, and/or zooming in to or out from an acoustic source. All this can be done by controlling the beamformer, which is typically implemented in software, such that no mechanical alteration of the microphone array is needed.

There are several standard microphone array geometries. The most common one is the linear array. Its advantage is its simplicity with respect to analysis and construction. Other geometries include planar arrays, random arrays, circular arrays, and spherical arrays. The spherical array has several advantages over the other geometries. The beampattern can be steered to any direction in three-dimensional (3-D) space, without changing the shape of the pattern. The spherical array also allows full 3-D control of the beampattern. Notwithstanding these advantages, there is also one major drawback. Conventional spherical arrays typically require many microphones. As a result, their implementation costs are relatively high.

SUMMARY OF THE INVENTION

Certain embodiments of the present invention are directed to microphone array-based audio systems that are designed to support representations of auditory scenes using second-order (or higher) harmonic expansions based on the audio signals generated by the microphone array. For example, in one embodiment, the present invention comprises a plurality of microphones (i.e., audio sensors) mounted on the surface of an acoustically rigid sphere. The number and location of the audio sensors on the sphere are designed to enable the audio signals generated by those sensors to be decomposed into a set of eigenbeams having at least one eigenbeam of order two (or higher). Beamforming (e.g., steering, weighting, and summing) can then be applied to the resulting eigenbeam outputs to generate one or more channels of audio signals that can be utilized to accurately render an auditory scene. As used in this specification, a full set of eigenbeams of order n refers to any set of mutually orthogonal beampatterns that form a basis set that can be used to represent any beampattern having order n or lower.

According to one embodiment, the present invention is a method for processing audio signals. A plurality of audio signals are received, where each audio signal has been generated by a different sensor of a microphone array. The plurality of audio signals are decomposed into a plurality of eigenbeam outputs, wherein each eigenbeam output corresponds to a different eigenbeam for the microphone array and at least one of the eigenbeams has an order of two or greater.

According to another embodiment, the present invention is a microphone comprising a plurality of sensors mounted in an arrangement, wherein the number and positions of sensors in the arrangement enable representation of a beampattern for the microphone as a series expansion involving at least one second-order eigenbeam.

According to yet another embodiment, the present invention is a method for generating an auditory scene. Eigenbeam outputs are received, the eigenbeam outputs having been generated by decomposing a plurality of audio signals, each audio signal having been generated by a different sensor of a microphone array, wherein each eigenbeam output corresponds to a different eigenbeam for the microphone array and at least one of the eigenbeam outputs corresponds to an eigenbeam having an order of two or greater. The auditory scene is generated based on the eigenbeam outputs and their corresponding eigenbeams.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 6 shows the mode magnitude for a continuous array centered around an acoustically soft sphere at distance r=1.1a;

FIG. 9 identifies the positions of the centers of the faces of a truncated icosahedron in spherical coordinates, where the angles are specified in degrees;

FIG. 20A shows the frequency weighting function of the output of the decomposer of FIG. 1, while

DETAILED DESCRIPTION

According to certain embodiments of the present invention, a microphone array generates a plurality of (time-varying) audio signals, one from each audio sensor in the array. The audio signals are then decomposed (e.g., by a digital signal processor or an analog multiplication network) into a (time-varying) series expansion involving discretely sampled, (at least) second-order (e.g., spherical) harmonics, where each term in the series expansion corresponds to the (time-varying) coefficient for a different three-dimensional eigenbeam. Note that a discrete second-order harmonic expansion involves zero-, first-, and second-order eigenbeams. The set of eigenbeams form an orthonormal set such that the inner-product between any two discretely sampled eigenbeams at the microphone locations, is ideally zero and the inner-product of any discretely sampled eigenbeam with itself is ideally one. This characteristic is referred to herein as the discrete orthonormality condition. Note that, in real-world implementations in which relatively small tolerances are allowed, the discrete orthonormality condition may be said to be satisfied when (1) the inner-product between any two different discretely sampled eigenbeams is zero or at least close to zero and (2) the inner-product of any discretely sampled eigenbeam with itself is one or at least close to one. The time-varying coefficients corresponding to the different eigenbeams are referred to herein as eigenbeam outputs, one for each different eigenbeam. Beamforming can then be performed (either in real-time or subsequently, and either locally or remotely, depending on the application) to create an auditory scene by selectively applying different weighting factors to the different eigenbeam outputs and summing together the resulting weighted eigenbeams.

In order to make a second-order harmonic expansion practicable, embodiments of the present invention are based on microphone arrays in which a sufficient number of audio sensors are mounted on the surface of a suitable structure in a suitable pattern. For example, in one embodiment, a number of audio sensors are mounted on the surface of an acoustically rigid sphere in a pattern that satisfies or nearly satisfies the above-mentioned discrete orthonormality condition. (Note that the present invention also covers embodiments whose sets of beams are mutually orthogonal without requiring all beams to be normalized.) As used in this specification, a structure is acoustically rigid if its acoustic impedance is much larger than the characteristic acoustic impedance of the medium surrounding it. The highest available order of the harmonic expansion is a function of the number and location of the sensors in the microphone array, the upper frequency limit, and the radius of the sphere.

Figure 1:
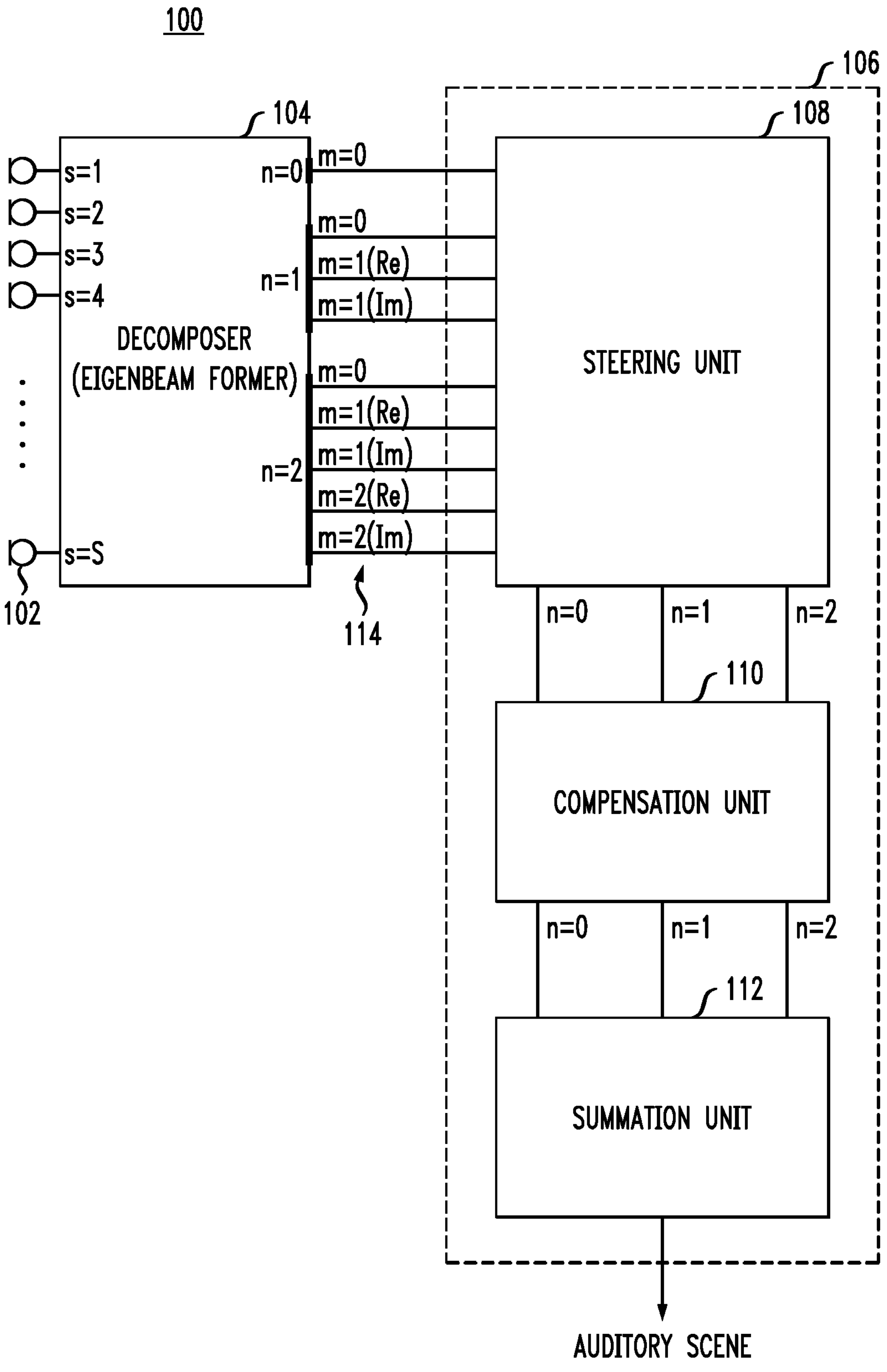
FIG. 1 shows a block diagram of an audio system, according to one embodiment of the present invention.

FIG. 1 shows a block diagram of a second-order audio system 100, according to one embodiment of the present invention. Audio system 100 comprises a plurality of audio sensors 102 configured to form a microphone array, a modal decomposer (i.e., eigenbeam former) 104, and a modal beamformer 106. In this particular embodiment, modal beamformer 106 comprises steering unit 108, compensation unit 110, and summation unit 112, each of which will be discussed in further detail later in this specification in conjunction with FIGS. 18-20.

Each audio sensor 102 in system 100 generates a time-varying analog or digital (depending on the implementation) audio signal corresponding to the sound incident at the location of that sensor. Modal decomposer 104 decomposes the audio signals generated by the different audio sensors to generate a set of time-varying eigenbeam outputs, where each eigenbeam output corresponds to a different eigenbeam for the microphone array. These eigenbeam outputs are then processed by beamformer 106 to generate an auditory scene. In this specification, the term "auditory scene" is used generically to refer to any desired output from an audio system, such as system 100 of FIG. 1. The definition of the particular auditory scene will vary from application to application. For example, the output generated by beamformer 106 may correspond to one or more output signals, e.g., one for each speaker used to generate the resultant auditory scene. Moreover, depending on the application, beamformer 106 may simultaneously generate beampatterns for two or more different auditory scenes, each of which can be independently steered to any direction in space.

Figure 2:
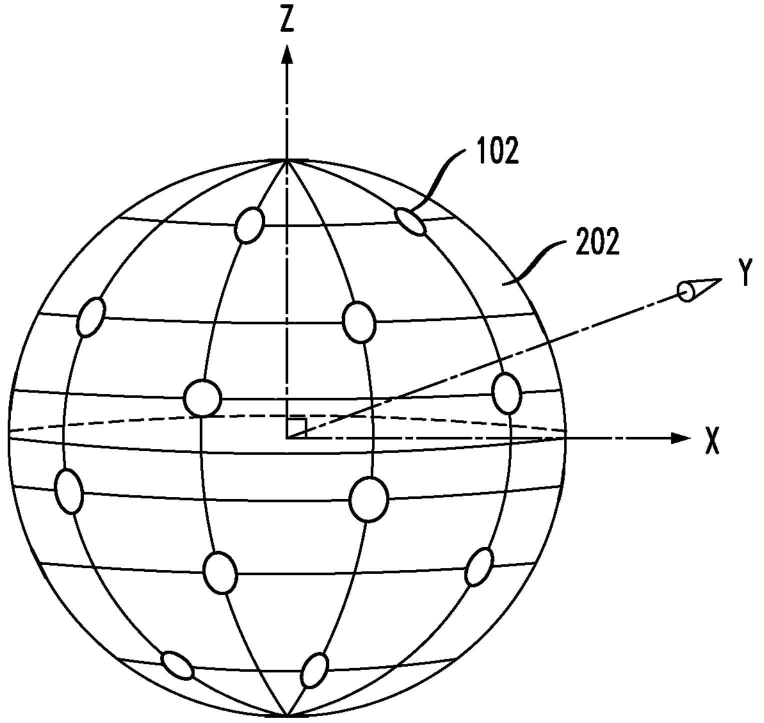
FIG. 2 shows a schematic diagram of a possible microphone array for the audio system of FIG. 1.

In certain implementations of system 100, audio sensors 102 are mounted on the surface of an acoustically rigid sphere to form the microphone array. FIG. 2 shows a schematic diagram of a possible microphone array 200 for audio system 100 of FIG. 1. In particular, microphone array 200 comprises 32 audio sensors 102 of FIG. 1 mounted on the surface of an acoustically rigid sphere 202 in a "truncated icosahedron" pattern. This pattern is described in further detail later in this specification in conjunction with FIG. 9. Each audio sensor 102 in microphone array 200 generates an audio signal that is transmitted to the modal decomposer 104 of FIG. 1 via some suitable (e.g., wired or wireless) connection (not shown in FIG. 2).

Referring again to FIG. 1, beamformer 106 exploits the geometry of the spherical array of FIG. 2 and relies on the spherical harmonic decomposition of the incoming sound field by decomposer 104 to construct a desired spatial response. Beamformer 106 can provide continuous steering of the beampattern in 3-D space by changing a few scalar multipliers, while the filters determining the beampattern itself remain constant. The shape of the beampattern is invariant with respect to the steering direction. Instead of using a filter for each audio sensor as in a conventional filter-and-sum beamformer, beamformer 106 needs only one filter per spherical harmonic, which can significantly reduce the computational cost.

Audio system 100 with the spherical array geometry of FIG. 2 enables accurate control over the beampattern in 3-D space. In addition to pencil-like beams, system 100 can also provide multi-direction beampatterns or toroidal beampatterns giving uniform directivity in one plane. These properties can be useful for applications such as general multichannel speech pick-up, video conferencing, or direction of arrival (DOA) estimation. It can also be used as an analysis tool for room acoustics to measure directional properties of the sound field.

Audio system 100 offers another advantage: it supports decomposition of the sound field into mutually orthogonal components, the eigenbeams (e.g., spherical harmonics) that can be used to reproduce the sound field. The eigenbeams are also suitable for wave field synthesis (WFS) methods that enable spatially accurate sound reproduction in a fairly large volume, allowing reproduction of the sound field that is present around the recording sphere. This allows all kinds of general real-time spatial audio applications.

Spherical Scatterer

A plane-wave G from the z-direction can be expressed according to Equation (1) as follows:

$$G(kr,\vartheta,t)=e^{i(\omega t+kr\cos\vartheta)}=\sum_{n=0}^{\infty}(2n+1)i^n j_n(kr)P_n(\cos\vartheta)e^{i\omega t} \quad (1)$$

where:

in general, in spherical coordinates, r represents the distance from the origin (i.e., the center of the microphone array), $\phi$ is the angle in the horizontal (i.e., x-y) plane from the x-axis, and $\theta$ is the elevation angle in the vertical direction from the z-axis;

here the spherical coordinates r and $\theta$ determine the observation point;

k represents the wavenumber, equal to $\omega/c$, where c is the speed of sound and $\omega$ is the frequency of the sound in radians/second;

t is time;

i is the imaginary constant (i.e., $\sqrt{-1}$);

$j_n$, stands for the spherical Bessel function of the first kind of order n; and $P_n$, denotes the Legendre function.

G can be seen as a function that describes the behavior of a plane-wave from the z-direction with unity magnitude and referenced to the origin. An important characteristic of the spherical Bessel functions $j_n$, is that they converge towards zero if the order n is larger than the argument kr. Therefore, only the series terms up to approximately $n=\lceil kr\rceil$ have to be taken into account. In the following sections, the sound pressure around acoustically rigid and soft spheres will be derived.

Acoustically Rigid Sphere

From Equation (1), the sound velocity for an impinging plane-wave on the surface of a sphere can be derived using Euler's Equation. In theory, if the sphere is acoustically rigid, then the sum of the radial velocities of the incoming and the reflected sound waves on the surface of the sphere is zero. Using this boundary condition, the reflected sound pressure can be determined, and the resulting sound pressure field becomes the superposition of the impinging and the reflected sound pressure fields, according to Equation (2) as follows:

$$G(kr,ka,\vartheta)=\sum_{n=0}^{\infty}(2n+1)i^n\left(j_n(kr)-\frac{j_n'(ka)}{h_n^{(2)\prime}(ka)}h_n^{(2)}(kr)\right)P_n(\cos\vartheta), \quad (2)$$

where:

a is the radius of the sphere;

a prime (') denotes the derivative with respect to the argument; and $h_n^{(2)}$ represent the spherical Hankel function of the second kind of order n.

In order to find a general expression that gives the sound pressure at a point $[r_s, \theta_s, \phi_s]$ for an impinging sound wave from direction $[\theta, \phi]$, an addition theorem given by Equation (3) as follows is helpful:

$$P_n(\cos\theta)=\sum_{m=-n}^{n}\frac{(n-m)!}{(n+m)!}P_n^m(\cos\vartheta)P_n^m(\cos\vartheta_s)e^{im(\varphi-\varphi_s)} \quad (3)$$

where $\theta$ is the angle between the impinging sound wave and the radius vector of the observation point. Substituting Equation (3) into Equation (2) yields the normalized sound pressure around a spherical scatterer according to Equation (4) as follows:

$$G(\vartheta_s,\varphi_s,kr_s,ka,\vartheta,\varphi)=\sum_{n=0}^{\infty}b_n(ka,kr_s)(2n+1)i^n\sum_{m=-n}^{n}\frac{(n-m)!}{(n+m)!}P_n^m(\cos\vartheta)P_n^m(\cos\vartheta_s)e^{im(\varphi-\varphi_s)} \quad (4)$$

where the coefficients $b_n$, are the radial-dependent terms given by Equation (5) as follows:

$$b_n(ka,kr_s)=\left(j_n(kr_s)-\frac{j_n'(ka)}{h_n^{(2)\prime}(ka)}h_n^{(2)}(kr_s)\right) \quad (5)$$

To simplify the notation further, spherical harmonics Y are introduced in Equation (4) resulting in Equation (6) as follows:

$$G(kr, ka, \vartheta, \varphi,) = 4\pi \sum_{n=0}^{\infty} i^n b_n(ka, kr_s) \sum_{m=-n}^{n} Y_n^m(\vartheta, \varphi) Y_n^{m^*}(\vartheta_s, \varphi_s), \tag{6}$$

where the superscripted asterisk (*) denotes the complex conjugate.

Acoustically Soft Sphere

In theory, for an acoustically soft sphere, the pressure on the surface is zero. Using this boundary condition, the sound pressure field around a soft spherical scatterer is given by Equation (7) as follows:

$$G(kr, ka, \vartheta) = \sum_{n=0}^{\infty} (2n+1) i^n \left( j_n(kr) - \frac{j_n(ka)}{h_n^{(2)}(ka)} h_n^{(2)}(kr) \right) P_n(\cos\vartheta) \tag{7}$$

Setting r equal to a, one sees that the boundary condition is fulfilled. The more general expressions for the sound pressure, like Equations (4) or (6) do not change, except for using a different $b_n$, given by Equation (8) as follows:

$$b_n^{(s)}(ka, kr_s) = \left( j_n(kr_s) - \frac{j_n(ka)}{h_n^{(2)}(ka)} h_n^{(2)}(kr_s) \right), \tag{8}$$

where the superscript (s) denotes the soft scatterer case.

Spherical Wave Incidence

The general case of spherical wave incidence is interesting since it will give an understanding of the operation of a spherical microphone array for nearfield sources. Another goal is to obtain an understanding of the nearfield-to-farfield transition for the spherical array. Typically, a farfield situation is assumed in microphone array beamforming. This implies that the sound pressure has planar wave-fronts and that the sound pressure magnitude is constant over the array aperture. If the array is too close to a sound source, neither assumption will hold. In particular, the wave-fronts will be curved, and the sound pressure magnitude will vary over the array aperture, being higher for microphones closer to the sound source and lower for those further away. This can cause significant errors in the nearfield beampattern (if the desired pattern is the farfield beampattern).

A spherical wave can be described according to Equation (9) as follows:

$$G(k, R, t) = A \frac{e^{i(\omega t - kR)}}{R} R \geq A, \tag{9}$$

where R is the distance between the source and the microphone, and A can be thought of as the source dimension. This brings two advantages: (a) G becomes dimensionless and (b) the problem of R=0 does not occur. With the source location described by the vector $r_l$, the sensor location described by $r_s$, and θ being the angle between $r_l$ and $r_s$, R may be given according to Equation (10) as follows:

$$R = \sqrt{r_l^2 + r_s^2 - 2 r_l r_s \cos(\theta)} \tag{10}$$

Equation (9) can be expressed in spherical coordinates according to Equation (11) as follows:

$$G(kr_s, kr_l, \theta) = -iAk \sum_{n=0}^{\infty} (2n+1) j_n(kr_s) h_n^{(2)}(kr_l) P_n(\cos\theta) r_l > r_s, \tag{11}$$

where $r_l$, is the magnitude of vector $r_l$, and the time dependency has been omitted. If this sound field hits a rigid spherical scatterer, the superposition of the impinging and the reflected sound fields may be given according to Equation (12) as follows:

$$\begin{aligned} G(kr, ka, \vartheta) = \\ -iAk \sum_{n=0}^{\infty} (2n+1) h_n^{(2)}(kr_l) \left( j_n(kr_s) - \frac{j_n'(ka)}{h_n^{(2)'}(ka)} h_n^{(2)}(kr_s) \right) P_n(\cos\theta) = \\ -i4\pi Ak \sum_{n=0}^{\infty} h_n^{(2)}(kr_l) b_n(ka, kr_s) \sum_{m=-n}^{n} Y_n^m(\vartheta_l, \varphi_l) Y_n^{m^*}(\vartheta_s, \varphi_s) \end{aligned} \tag{12}$$

To show the connection to the farfield, assume $kr_l$ 1. The Hankel function can then be replaced by Equation (13) as follows:

$$h_n^{(2)}(kr_l) \approx i^{n+1} \frac{e^{-ikr_l}}{kr_l} \text{for } kr_l \; 1 \tag{13}$$

Substituting Equation (13) in Equation (12) yields Equation (14) as follows:

$$G(kr, ka, \vartheta) = 4\pi \frac{A}{r_l} e^{-ikr_l} \sum_{n=0}^{\infty} i^n b_n(ka, kr_s) \sum_{m=-n}^{n} Y_n^m(\vartheta_l, \varphi_l) Y_n^{m^*}(\vartheta_s, \varphi_s) \tag{14}$$

Except for an amplitude scaling and a phase shift, Equation (14) equals the farfield solution, given in Equation (6). The next section will give more details about the transition from nearfield to farfield, based on the results presented above.

Modal Beamforming

Modal beamforming is a powerful technique in beampattern design. Modal beamforming is based on an orthogonal decomposition of the sound field, where each component is multiplied by a given coefficient to yield the desired pattern. This procedure will now be described in more detail for a continuous spherical pressure sensor on the surface of a rigid sphere.

Assume that the continuous spherical microphone array has an aperture weighting function given by h(θ, ϕ, ω). Since this is a continuous function on a sphere, h can be expanded into a series of spherical harmonics according to Equation (15) as follows:

$$h(\vartheta, \varphi, \omega) = \sum_{n=0}^{\infty} \sum_{m=-n}^{n} C_{nm}(\omega) Y_n^m(\vartheta, \varphi). \tag{15}$$

The array factor F, which describes the directional response of the array, is given by Equation (16) as follows:

$$F(\vartheta, \varphi, \omega) = \frac{1}{4\pi}\int_{\Omega} h(\vartheta_m, \varphi_m, \omega)G(\vartheta_m, \varphi_m, r_m, \vartheta, \varphi, \omega)d\Omega, \quad (16)$$

where Ω symbolizes the 4π space. To simplify the notation, the array factor is first computed for a single mode n'm', where n' is the order and m' is the degree. In the following analysis, a spherical scatterer with plane-wave incidence is assumed. Changes to adopt this derivation for a soft scatterer and/or spherical wave incidence are straightforward. For the plane-wave case, the array factor becomes Equation (17) as follows:

$$F_{n',m'}(\vartheta, \varphi, \omega) = \int_{\Omega_s} C_{n'm'}(\omega) \sum_{n=0}^{\infty} i^n b_n(ka, kr_s) \sum_{m=-n}^{n} Y_n^m(\vartheta, \varphi) Y_n^{m*}(\vartheta_s, \varphi_s) Y_{n'}^{m'}(\vartheta_s, \varphi_s) d\Omega_s = C_{n'm'}(\omega) i^n b_n(ka, kr_s) Y_{n'}^{m'}(\vartheta, \varphi) \quad (17)$$

This means that the farfield pattern for a single mode is identical to the sensitivity function of this mode, except for a frequency-dependent scaling. The complete array factor can now be obtained by adding up all modes according to Equation (18) as follows:

$$F(\vartheta, \varphi, \omega) = \sum_{n=0}^{\infty}\sum_{m=-n}^{n} C_{nm}(\omega) i^n b_n(ka, kr_s) Y_n^m(\vartheta, \varphi). \quad (18)$$

Comparing Equation (18) with Equation (15), if C is normalized according to Equation (19) as follows:

$$C_{nm}(\omega) = \frac{C_{nm}(\omega)}{i^n b_n(ka, kr_s)}, \quad (19)$$

then the array factor equals the aperture weighting function. This results in the following steps to implement a desired beampattern:

(1) Determine the desired beampattern h;

(2) Compute the series coefficients C;

(3) Normalize the coefficients according to Equation (19); and (4) Apply the aperture weighting function of Equation (15) to the array using the normalized coefficients from step (3).

Equation (18) is a spherical harmonic expansion of the array factor. Since the spherical harmonics Y are mutually orthogonal, a desired beampattern can be easily designed. For example, if $C_{00}$ and $C_{10}$ are chosen to be unity and all other coefficients are set to zero, then the superposition of the omnidirectional mode ($Y_0$) and the dipole mode ($Y_1^0$) will result in a cardioid pattern.

From Equation (19), the term $i^n b_n$, plays an important role in the beamforming process. This term will be analyzed further in the following sections. Also, the corresponding terms for a velocity sensor, a soft sphere, and spherical wave incidence will be given.

Acoustically Rigid Sphere

Figure 3A:
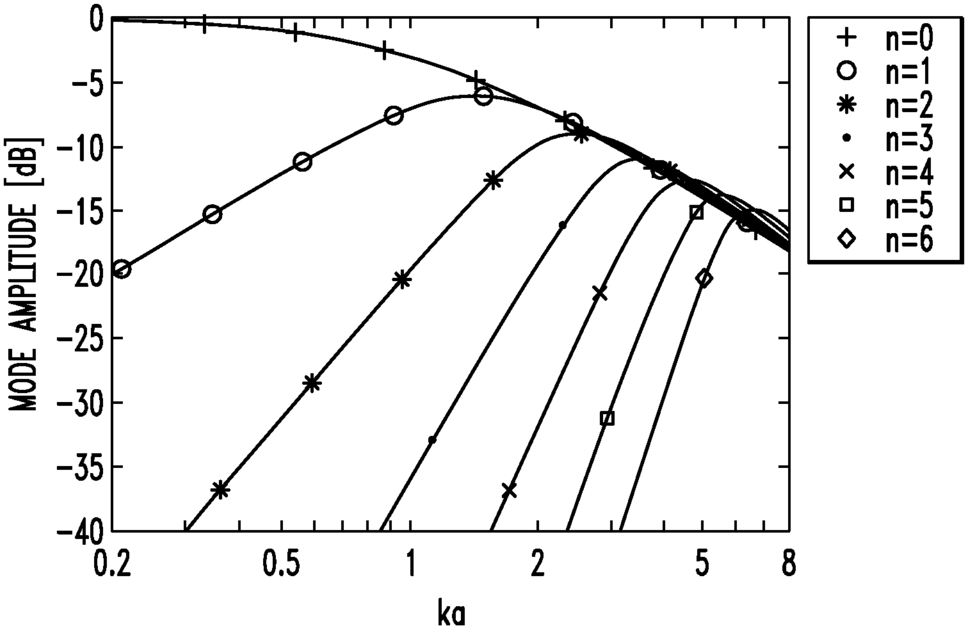
FIG. 3A shows the mode amplitude for a continuous array on the surface of an acoustically rigid sphere (r=a)

For an array on a rigid sphere, the coefficients $b_n$ are given by Equation (5). These coefficients give the strength of the mode dependent on the frequency. FIG. 3A shows the magnitude of the coefficients $b_n$ for orders n=0 to n=6 for an array on the surface of the sphere (r=a), where a continuous array of omnidirectional sensors is assumed. In FIG. 3A, for very low frequencies, only the zero mode is present. For ka=0.2 (for a sphere with a radius of a=5 cm, this results in a frequency of about 220 Hz), the first mode is down by 20 dB. At higher frequencies, more modes emerge. Once the mode has reached a certain level, it can be used to form the directivity pattern. The required level depends on the amount of noise and design robustness for the array. For example, in order to use the second-order mode at ka=0.3, it is preferably amplified by about 40 dB.

Figure 3B:
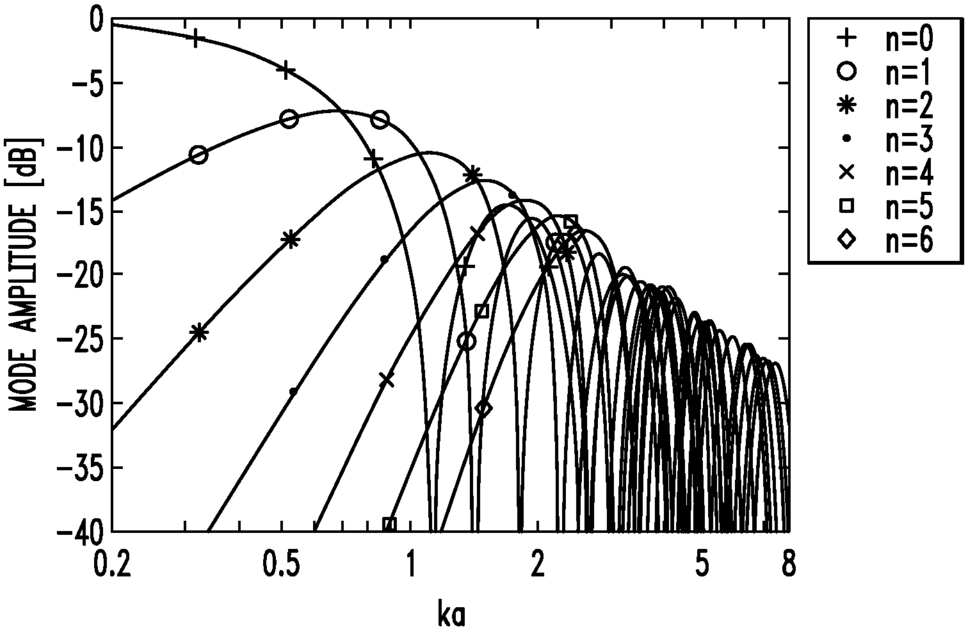
FIG. 3B shows the mode amplitude for a continuous array elevated over the surface of an acoustically rigid sphere.

Instead of mounting the array of sensors on the surface of the sphere, in alternative embodiments, one or more or even all of the sensors can be mounted at elevated positions over the surface of the sphere. FIG. 3B shows the mode coefficients for an elevated array, where the distance between the array and the spherical surface is 2a. In contrast to the array on the surface represented in FIG. 3A, the frequency response shown in FIG. 3B has zeros. This limits the usable bandwidth of such an array. One advantage is that the amplitude at low frequencies is significantly higher, which allows higher directivity at lower frequencies.

Acoustically Rigid Sphere with Velocity Microphones

Instead of using pressure sensors, velocity sensors could be used. From Equation (2), the radial velocity is given by Equation (20) as follows:

$$v_r(kr, ka, \vartheta) = \frac{1}{i\omega\rho_0}\frac{\partial G(kr, ka, \vartheta)}{\partial r} = \frac{1}{i\rho_0 c}\sum_{n=0}^{\infty}(2n+1)i^n\left(j_n'(kr) - \frac{j_n'(ka)}{h_n^{(2)'}(ka)}h_n^{(2)'}(kr)\right)P_n(\cos\vartheta) \quad (20)$$

According to the boundary condition on the surface of an acoustically rigid sphere, the velocity for r=a will be zero, as indicated by Equation (20). The mode coefficients for the radial velocity sensors are given by Equation (21) as follows:

$$\hat{b}_n(ka, kr) = \left(j_n'(kr) - \frac{j_n'(ka)}{h_n^{(2)'}(ka)}h_n^{(2)'}(kr)\right) \quad (21)$$

Figure 4:
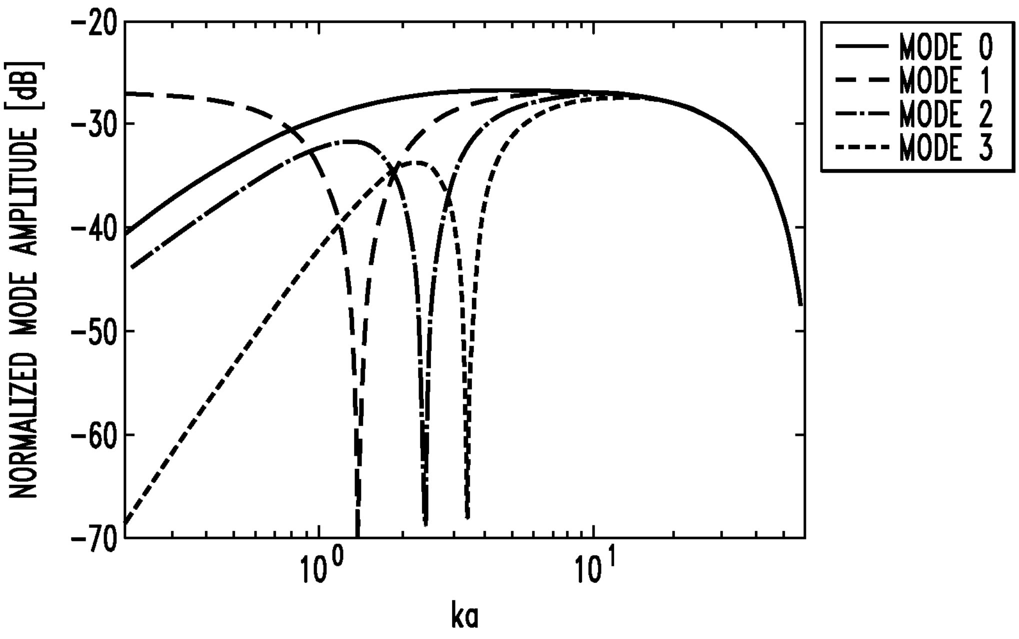
FIGS. 4 and 5 show the mode magnitude for velocity sensors oriented radially at $r_s$=1.05a and 1.1a, respectively.
Figure 5:
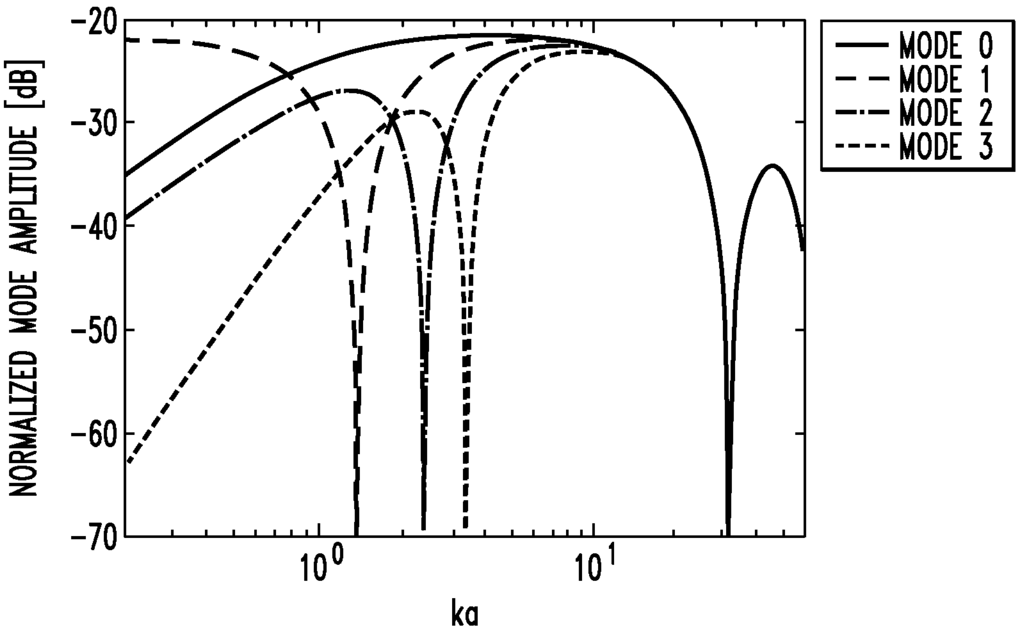

FIGS. 4 and 5 show the mode magnitude for velocity sensors oriented radially at $r_s$=1.05a and 1.1a, respectively. These sensors behave very differently from the omnidirectional sensors. For low frequencies, the first-order mode is dominant. This is the "native" mode of a velocity sensor. Mode zero and mode two are also quite strong. This would enable a higher directivity at very low frequencies compared to the pressure modes. A drawback of the velocity modes is their characteristic to have singularities in the modes in the desired operating frequency range. This means that, before a mode is used for a directivity pattern, it should be checked to see if it has a singularity for a desired frequency. Fortunately, the singularities do not appear frequently but show up only once per mode in the typical frequency range of interest. The singularities in the velocity modes correspond to the maxima in the pressure modes. They also experience a 90° phase shift (compare Equations (20) and (6)).

The difference between FIG. 4 and FIG. 5 is the distance of the microphones to the surface of the sphere. Comparing the two figures one finds that the sensitivity is higher for a larger distance. This is true as long as the distance is less than one quarter of a wavelength. At that distance from a rigid wall, the velocity has a maximum. For a distance of half the wavelength, the velocity is zero, which means that the distance of the array from the surface of the sphere should not be increased arbitrarily. For d=1.1a, a distance of λ/2 away from the surface corresponds to ka=10π. This corresponds to the position of the zero in FIG. 5.

For a fixed distance, the velocity increases with frequency. This is true as long as the distance is greater than one quarter of the wavelength. Since, at the same time, the energy is spread over an increasing number of modes, the mode magnitude does not roll off with a −6 dB slope, as is the case for the pressure modes.

Unfortunately, there are no true velocity microphones of very small sizes. Typically, a velocity microphone is implemented as an equalized first-order pressure differential microphone. Comparing this to Equation (20), the coefficients $b_n$ are then scaled by k. Since usually the pressure differential is approximated by only the pressure difference between two omnidirectional microphones, an additional scaling of 20 log(l) is taken into account, where l is the distance between the two microphones.

Acoustically Soft Sphere

Figure 6:
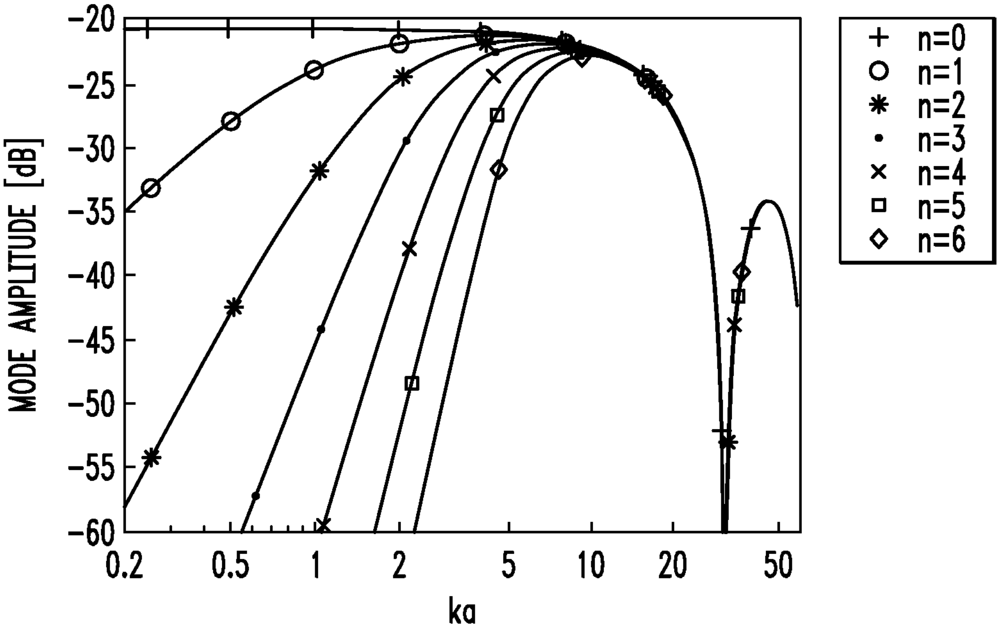

For a plane-wave impinging onto an acoustically soft sphere, the pressure mode coefficients become $i^n b_n^{(s)}$. The magnitude of these is plotted in FIG. 6 for a distance of 1.1a. They look like a mixture of the pressure modes and the velocity modes for the rigid sphere. For low frequencies, only the zero-order mode is present. With increasing frequency, more and more modes emerge. The rising slope is about 6n dB, where n is the order of the mode. Similar to the velocity in front of a rigid surface, the pressure in front of a soft surface becomes zero at a distance of half of a wavelength away from the surface. Similar to the velocity modes in front of a rigid scatterer, the effect of decreasing mode magnitude with an increasing number of modes is compensated by the fact that the pressure increases for a fixed distance until the distance is a quarter wavelength. Therefore, the mode magnitude remains more or less constant up to this point.

Acoustically Soft Sphere with Velocity Microphones

For velocity microphones on the surface of a soft sphere, the mode coefficients are given by Equation (22) as follows:

$$\hat{b}_n^{(s)}(ka, kr) = \left( j_n'(kr) - \frac{j_n(ka)}{h_n^{(2)}(ka)} h_n^{(2)\prime}(kr) \right) \tag{22}$$

Figure 7:
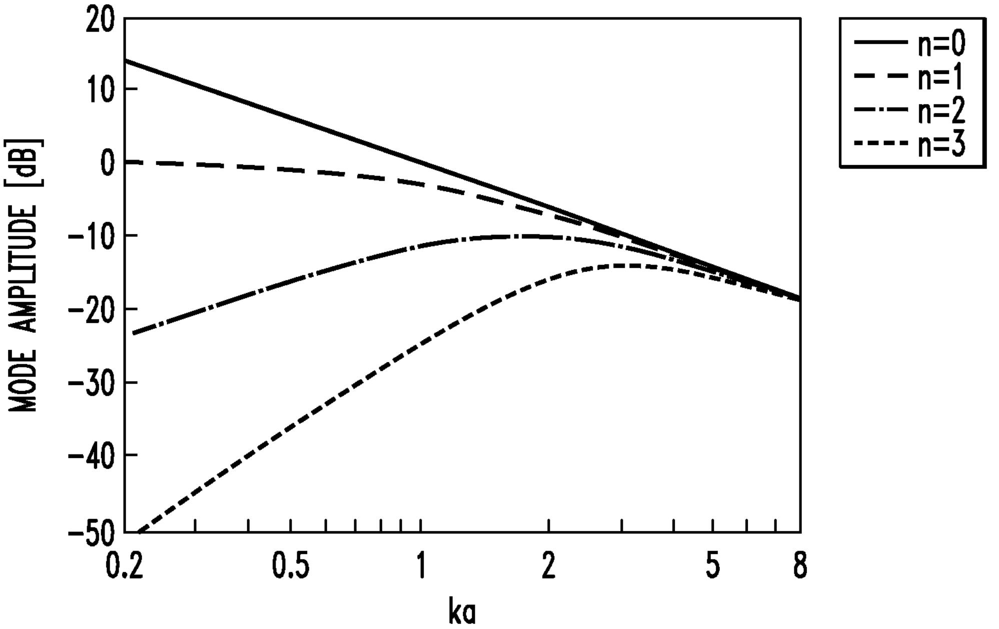
FIG. 7 shows velocity modes on the surface of a soft sphere.
Figure 8A:
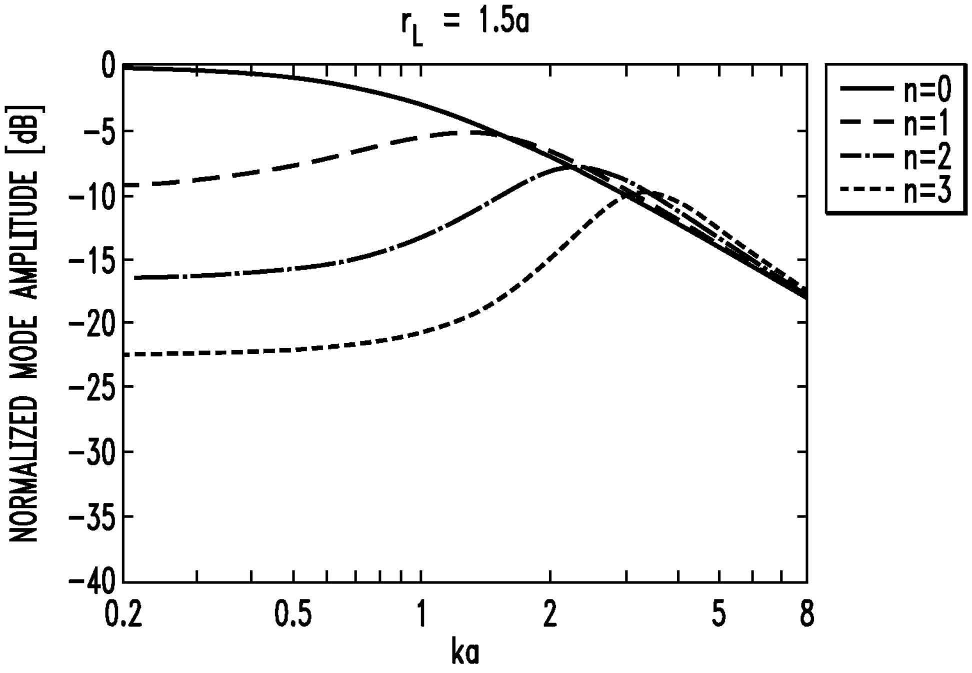
FIGS. 8A-D show normalized pressure mode amplitude on the surface of a rigid sphere for spherical wave incidence for various distances $r_l$, of the sound source.
Figure 8B:
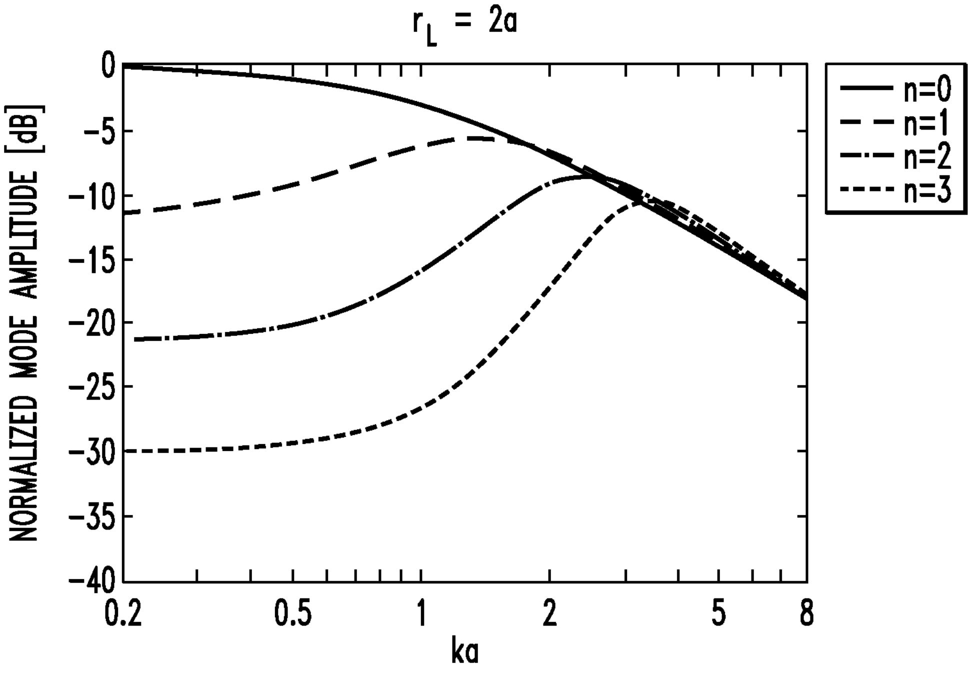
Figure 8C:
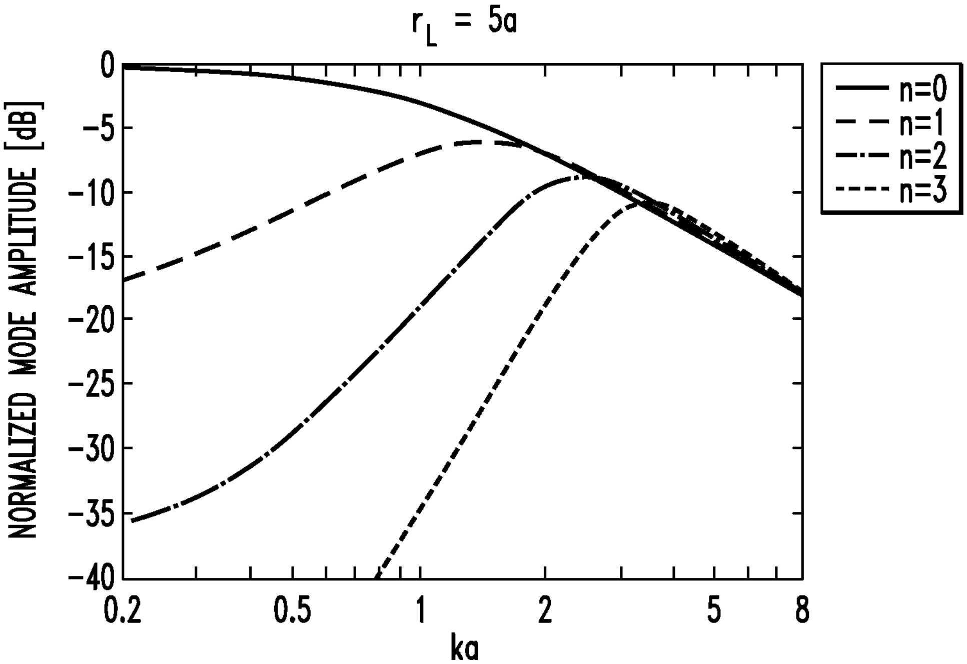
Figure 8D:
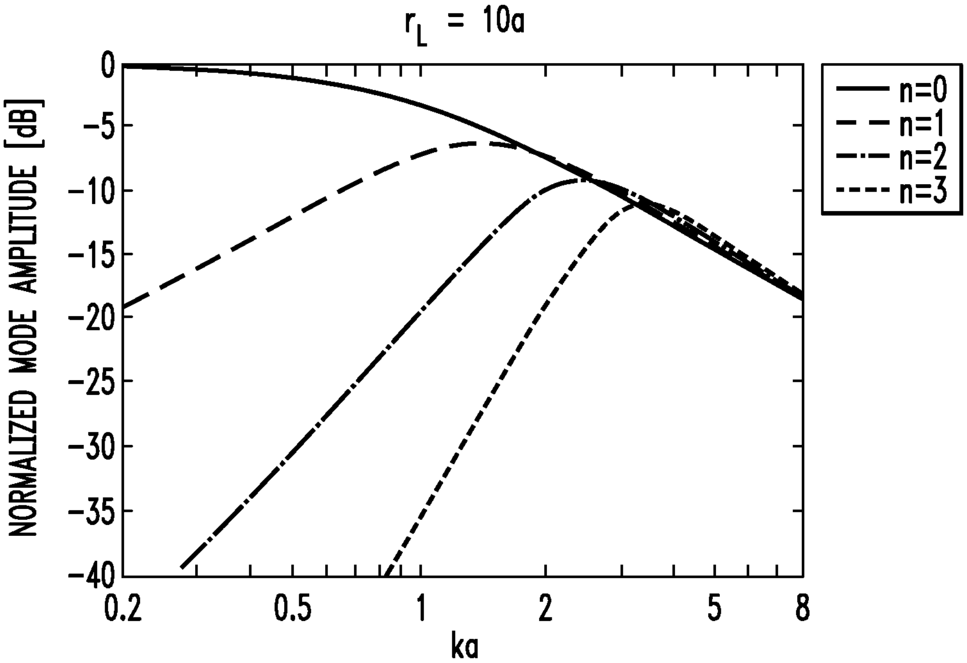

The magnitude of these coefficients is plotted in FIG. 7. They behave similar to the pressure modes for the rigid sphere, except that all modes are "shifted" one to the left. They start with a slope of about 6(n−1) dB. This is attractive especially for low frequencies. For example, at ka=0.2, mode zero and mode one are only about 13 dB apart, while, for the pressure modes, there is a difference of about 20 dB. Also, between mode one and mode two, the gap is reduced by about 4 dB. This configuration will allow high directivity for a given signal-to-noise ratio.

One way to implement an array with velocity sensors on the surface of a soft sphere might be to use vibration sensors that detect the normal velocity at the surface. However, the bigger problem will be to build a soft sphere. The term "soft" ideally means that the specific impedance of the sphere is zero. In practice, it will be sufficient if the impedance of the sphere is much less that the impedance of the medium surrounding the sphere. Since the specific impedance of air is quite low ($Z_s=\rho_0 c=414$ kg/m²s), building a soft sphere for airborne sound in essentially infeasible. However, a soft sphere can be implemented for underwater applications. Since water has a specific impedance of $1.48*10^6$ kg/m²s, an elastic shell filled with air could be used as a soft sphere.

Spherical Wave Incidence

This section describes the case of a spherical wave impinging onto a rigid spherical scatterer. Since the pressure modes are the most practical ones, only they will be covered. The results will give an understanding of the nearfield-to-farfield transition.

According to Equation (12), the mode coefficients for spherical sound incidence are given by Equation (23) as follows:

$$b_n^{(p)}(ka,kr_s,kr_l)=kh_n^{(2)}(kr_l)b_n(ka,kr_s) \tag{23}$$

where the superscript (p) indicates spherical wave incidence. The mode coefficients are a scaled version of the farfield pressure modes.

In FIGS. 8A-D, the magnitude of the modes is plotted for various distances $r_l$, of the sound source. For short distances of the sound source, the higher modes are of higher magnitude at low ka. They also do not show the 6n dB increase but are relatively constant. This behavior can be explained by looking at the low argument limit of the scaling factor given by Equation (24) as follows:

$$kh_n^{(2)}(kr_l) = i\frac{(2n+1)!}{2^n n!}\frac{1}{r_l^{n+1}}\frac{1}{k^n} \text{ for } kr_l \; 1 \tag{24}$$

Thus, for low $kr_l$, the scaling factor has a slope of about −6n dB, which compensates the 6n dB slope of $b_n$, and results in a constant. The appearance of the higher-order modes at low ka's becomes clear by keeping in mind that the modes correspond to a spherical harmonic decomposition of the sound pressure distribution on the surface of the sphere. The shorter the distance of the source from the sphere, the more unequal will be the sound pressure distribution even for low frequencies, and this will result in higher-order terms in the spherical harmonics series. This also means that, for short source distances, a higher directivity at low frequencies could be achieved since more modes can be used for the beampattern. However, this beampattern will be valid only for the designed source distance. For all other distances, the modes will experience a scaling that will result in the beampattern given by Equation (25) as follows:

$$F(\vartheta, \varphi, \omega) = \sum_{n=0}^{\infty}\sum_{m=-n}^{n} \frac{h_n^{(2)}(kr_l')}{h_n^{(2)}(kr_l)} C_{nm}(\omega) Y_n^m(\vartheta, \varphi). \tag{25}$$

The design distance is $r_l$, while the actual source distance is denoted $r_l'$.

To allow a better comparison, the mode magnitude in FIGS. 8A-D is normalized so that mode zero is unity (about 0 dB) for ka→0. This normalization removes the $1/r_l$ dependency for point sources.

For the high argument limit, it was already shown that the mode coefficients are equal to the plane-wave incidence. Comparing the spherical wave incidence for larger source distances (FIG. 8D, $r_l$=10a) with plane-wave incidence (FIG. 3A), one finds only small differences for low ka. For example, at ka=0.2, mode one is about 1 to 2 dB stronger for the spherical wave incidence. Since the array is preferably designed robust against magnitude and phase errors, these small deviations are not expected to cause significant degradation in the array performance. Therefore, a source distance of about ten times the radius of the sphere can be regarded as farfield.

Sampling the Sphere

So far, only a continuous array has been treated. On the other hand, an actual array is implemented using a finite number of sensors corresponding to a sampling of the continuous array. Intuitively, this sampling should be as uniform as possible. Unfortunately, there exist only five possibilities to divide the surface of a sphere in equivalent areas. These five geometries, which are known as regular polyhedrons or Platonic Solids, consist of 4, 6, 8, 12, and 20 faces, respectively. Another geometry that comes close to a regular division is the so-called truncated icosahedron, which is an icosahedron having vertices cut off. Thus, the term "truncated." This results in a solid consisting of 20 hexagons and 12 pentagons. A microphone array based on a truncated icosahedron is referred to herein as a TIA (truncated icosahedron array). FIG. 9 identifies the positions of the centers of the faces of a truncated icosahedron in spherical coordinates, where the angles are specified in degrees. FIG. 2 illustrates the microphone locations for a TIA on the surface of a sphere.

Other possible microphone arrangements include the center of the faces (20 microphones) of an icosahedron or the center of the edges of an icosahedron (30 microphones). In general, the more microphones used, the higher will be the upper maximum frequency. On the other hand, the cost usually increases with the number of microphones.

Referring again to the TIA of FIGS. 2 and 9, each microphone positioned at the center of a pentagon has five neighbors at a distance of 0.65a, where a is the radius of the sphere. Each microphone positioned at the center of a hexagon has six neighbors, of which three are at a distance of 0.65a and the other three are at a distance of 0.73a. Applying the sampling theorem ($d<\lambda/2$, d being the distance of the sensors, $\lambda$ being the wavelength) and, taking the worst case, the maximum frequency is given by Equation (26) as follows:

$$f_{max} < \frac{c}{2*0.73a}, \tag{26}$$

where c is the speed of sound. For a sphere with radius a=5 cm, this results in an upper frequency limit of 4.7 kHz. In practice, a slightly higher maximum frequency can be expected since most microphone distances are less than 0.73a, namely 0.65a. The upper frequency limit can be increased by reducing the radius of the sphere. On the other hand, reducing the radius of the sphere would reduce the achievable directivity at low frequencies. Therefore, a radius of 5 cm is a good compromise.

Equation (15) gives the aperture weighting function for the continuous array. Using discrete elements, this function will be sampled at the sensor location, resulting in the sensor weights given by Equation (27) as follows:

$$h_s(\omega) = \sum_{n=0}^{\infty}\sum_{m=-n}^{n} C_{nm}(\omega)Y_n^m(\vartheta_s, \varphi_s), \tag{27}$$

where the index s denotes the s-th sensor. The array factor given in Equation (16) now turns into a sum according to Equation (28) as follows:

$$F(\vartheta, \varphi, \omega) = \frac{1}{M}\sum_{s=0}^{M-1} h_s(\vartheta_s, \varphi_s, \omega)G(\vartheta_s, \varphi_s, r_s, \vartheta, \varphi, \omega) \tag{28}$$

With a discrete array, spatial aliasing should be taken into account. Similar to time aliasing, spatial aliasing occurs when a spatial function, e.g., the spherical harmonics, is undersampled. For example, in order to distinguish 16 harmonics, at least 16 sensors are needed. In addition, the positions of the sensors are important. For this description, it is assumed that there are a sufficient number of sensors located in suitable positions such that spatial aliasing effects can be neglected. In that case, Equation (28) will become Equation (29) as follows:

$$F(\vartheta, \varphi, \omega) = \sum_{n=0}^{\infty}\sum_{m=-n}^{n} C_{nm}(\omega)i^n b_n(ka, kr_s)Y_n^m(\vartheta, \varphi). \tag{29}$$

which requires Equation (30) to be (at least substantially) satisfied as follows:

$$\sum_{s=0}^{M-1} Y_n^{m*}(\vartheta_s, \varphi_s)Y_{n'}^{m'}(\vartheta_s, \varphi_s) = \frac{M}{4\pi}\delta_{nn'}\delta_{mm'}, \tag{30}$$

To account for deviations, a correction factor $\alpha_{nm}$, can be introduced. For best performance, this factor should be close to one for all n,m of interest.

Robustness Measure (White Noise Gain)

The white noise gain (WNG), which is the inverse of noise sensitivity, is a robustness measure with respect to errors in the array setup. These errors include the sensor positions, the filter weights, and the sensor self-noise. The WNG as a function of frequency is defined according to Equation (31) as follows:

$$WNG(\omega) = \frac{|F(\vartheta_0, \varphi_0, \omega)|^2}{\sum_{s=0}^{M-1}|h_s(\omega)|^2} \tag{31}$$

The numerator is the signal energy at the output of the array, while the denominator can be seen as the output noise caused by the sensor self-noise. The sensor noise is assumed to be independent from sensor to sensor. This measure also describes the sensitivity of the array to errors in the setup.

The goal is now to find some general approximations for the WNG that give some indications about the sensitivity of the array to noise, position errors, and magnitude and phase errors. To simplify the notations, the look direction is assumed to be in the z-direction. The numerator can then be found from Equation (28) according to Equation (32) as follows:

$$|F(0, 0, \omega)|^2 = \left|M\sum_{n=0}^{N} C_n(\omega)Y_n(0, 0)\right|^2 = \left|M\sum_{n=0}^{N} C_n(\omega)\sqrt{\frac{2n+1}{4\pi}}\right|^2, \tag{32}$$

where N is the highest-order mode used for the beamforming. The number of all spherical harmonics up to $N^{th}$ order is $(N+1)^2$. The denominator is given by Equation (27) according to Equation (33) as follows:

$$\sum_{s=0}^{M-1} |h_s(\omega)|^2 = \sum_{s=0}^{M-1} \left| \sum_{n=0}^{N} C_n(\omega) Y_n(\vartheta_s, \varphi_s) \right|^2 = \sum_{s=0}^{M-1} \left| \sum_{n=0}^{N} \frac{C_n(\omega)}{i^n b_n(\omega)} \sqrt{\frac{2n+1}{4\pi}} P_n(\cos\vartheta_s) \right|^2 \tag{33}$$

Given Equations (32) and (33), a general prediction of the WNG is difficult. Two special cases will be treated here: first, for a desired pattern that has only one mode and, second, for a superdirectional pattern for which $b_N << b_{N-1}$ (compare FIG. 3A).

If only mode N is present in the pattern, the WNG becomes Equation (34) as follows:

$$WNG(\omega) = \frac{M^2 |C_N(\omega)|^2 \frac{2N+1}{4\pi}}{\left| \frac{C_N(\omega)}{i^N b_N(\omega)} \right|^2 \frac{2N+1}{4\pi} \sum_{s=0}^{M-1} |P_N(\cos\vartheta_s)|^2} = \frac{M^2 |b_N(\omega)|^2}{\sum_{s=0}^{M-1} |P_N(\cos\vartheta_s)|^2} \tag{34}$$

For the omnidirectional (zero-order) mode, the numerator of Equation (34) equals M. Since $b_0$ is unity for low frequency (compare FIG. 3A), WNG=M. This is the well-known result for a delay-and-sum beamformer. It is also the highest achievable WNG. As the frequency increases, $b_0$ decreases and so does the WNG. For other modes, the numerator is dependent on the sampling scheme of the array and has to be determined individually.

Another coarse approximation can be given for the superdirectional case when $b_N << b_{N-1}$. In this case, the sum over the $(N+1)^2$ modes in the nominator is dominated by the N-th mode and, using Equations (32) and (33), the WNG results in Equation (35) as follows:

$$WNG(\omega) = \frac{M^2 \left| \sum_{n=0}^{N} C_n(\omega) \sqrt{\frac{2n+1}{4\pi}} \right|^2}{\left| C_n(\omega) \sqrt{\frac{2n+1}{4\pi}} \right|^2 \sum_{s=0}^{M-1} |P_N(\cos\vartheta_s)|^2} |b_n(\omega)|^2 \tag{35}$$

Equation (35) can be further simplified if the term $C_n\sqrt{(2n+1/(4\pi))}$ is constant for all modes. This would result in a sinc-shaped pattern. In this case, the WNG becomes Equation (36) as follows:

$$WNG(\omega) = \frac{M^2 |N+1|^2}{\sum_{s=0}^{M-1} |P_N(\cos\vartheta_s)|^2} |b_n(\omega)|^2 \tag{36}$$

This result is similar to Equation (34), except that the WNG is increased by a factor of $(N+1)^2$. This is reasonable, since every mode that is picked up by the array increases the output signal level.

Pattern Synthesis

This section will give two suggestions on how to get the coefficients $C_{nm}$ that are used to compute the sensor weights $h_s$ according to Equation (27). The first approach implements a desired beampattern h(θ, ϕ, ω), while the second one maximizes the directivity index (DI). There are many more ways to design a beampattern. Both methods described below will assume a look direction towards θ=0. After those two methods, the subsequent section describes how to turn the pattern, e.g., to steer the main lobe to any desired direction in 3-D space.

Implementing a Desired Beampattern

For a beampattern with look direction θ=0 and rotational symmetry in ϕ-direction, the coefficients $C_{nm}$ can be computed according to Equation (37) as follows:

$$C_n(\omega) = 2\pi \int_0^{\pi} Y_n(\vartheta, \varphi) h(\vartheta, \omega) \sin\vartheta \, d\vartheta \tag{37}$$

The question remains how to choose the pattern h itself. This depends very much on the application for which the array will be used. As an example, Table 1 gives the coefficients $C_n$ in order to get a hypercardioid pattern of order n, where the pattern h is normalized to unity for the look direction. The coefficients are given up to third order.

TABLE 1

Coefficients for hypercardioid patterns of order n.

| Order | $C_0$ | $C_1$ | $C_2$ | $C_3$ |
|---|---|---|---|---|
| 1 | 0.8862 | 1.535 | 0 | 0 |
| 2 | 0.3939 | 0.6822 | 0.8807 | 0 |
| 3 | 0.2216 | 0.3837 | 0.4954 | 0.5862 |

Figure 10:
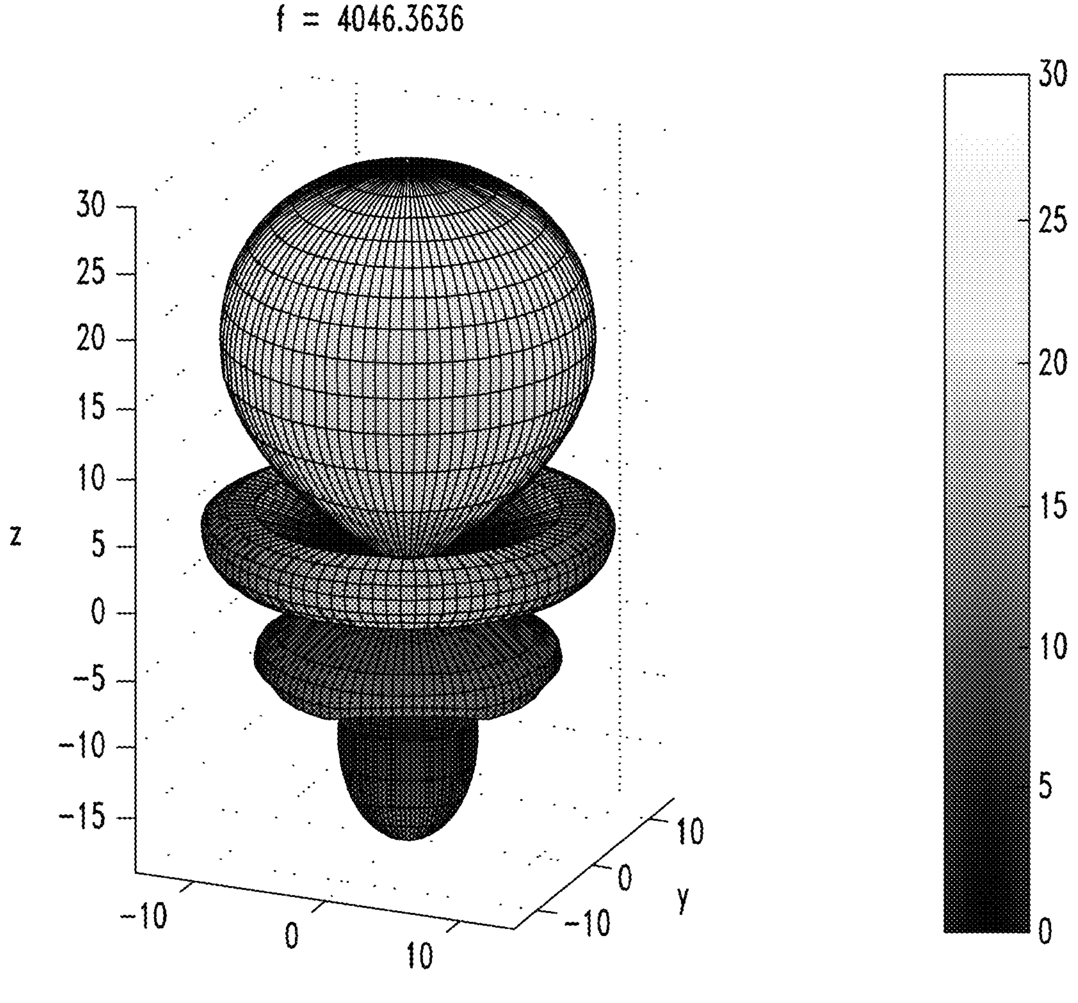
FIG. 10 shows the 3-D directivity pattern of a third-order hypercardioid pattern at 4 kHz using the truncated icosahedron array on the surface of a sphere of radius 5 cm.

FIG. 10 shows the 3-D pattern of a third-order hypercardioid at 4 kHz, where the microphones are positioned on the surface of a sphere of radius 5 cm at the center of the faces of a truncated icosahedron. Ideally, the pattern should be frequency independent, but, due to the sampling of the spherical surface, aliasing effects show up at higher frequencies. In FIG. 10, a small effect caused by the spatial sampling can be seen in the second side lobe. The pattern is not perfectly rotationally symmetric. This effect becomes worse with increasing frequency. On a sphere of radius 5 cm, this sampling scheme will yield good results up to about 5 kHz.

Figure 11:
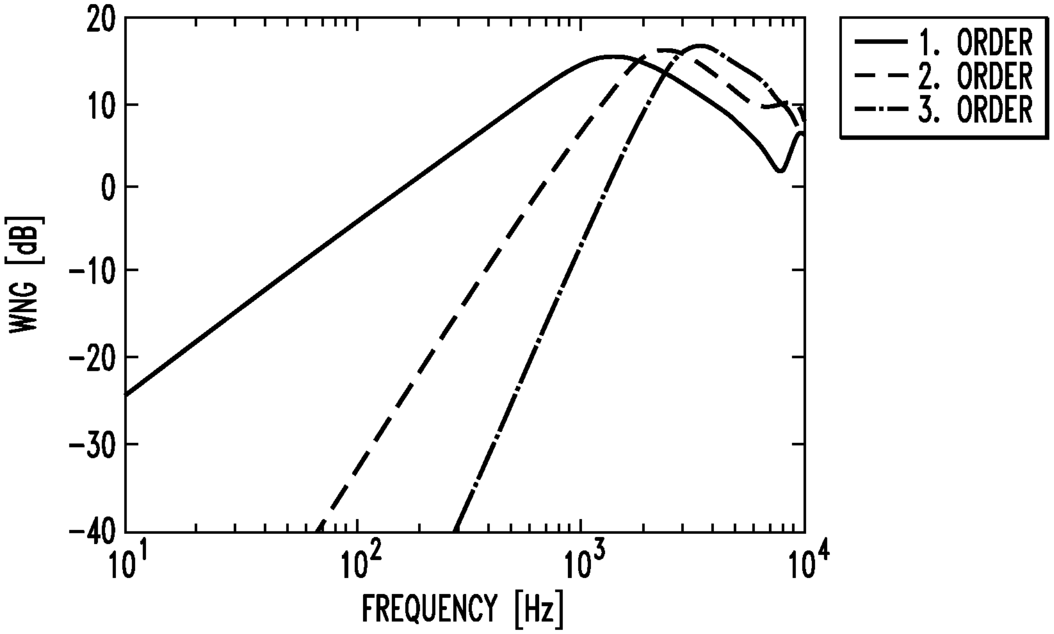
FIG. 11 shows the white noise gain (WNG) of hypercardioid patterns of different order implemented with the truncated icosahedron array on a sphere with a=5 cm.

If the pattern from FIG. 10 is implemented with frequency-independent coefficients $C_n$, problems may occur with the WNG at low frequencies. This can be seen in FIG. 11. In particular, higher-order patterns may be difficult to implement at lower frequencies. On the other hand, implementing a pattern of only first order for all frequencies means wasting directivity at higher frequencies.

Figure 12:
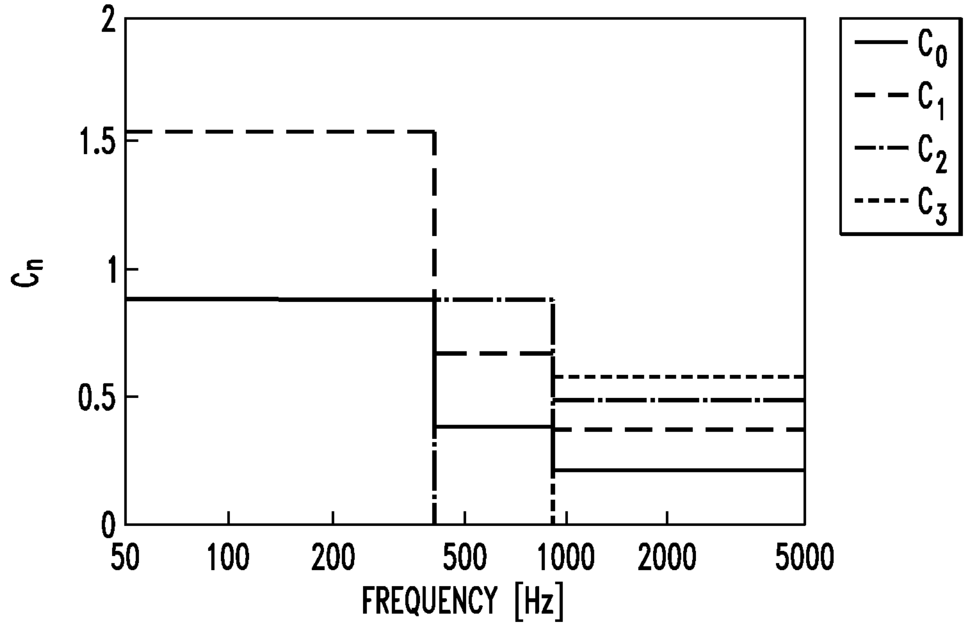
FIG. 12 shows the principle filter shape to generate a hypercardioid pattern with a guaranteed minimum WNG.

Instead of choosing a constant pattern, it may make more sense to design for a constant WNG. The quality of the sensors used and the accuracy with which the array is built determine the allowable minimum WNG that can be accepted. A reasonable value is a WNG of −10 dB. Using hypercardioid patterns results in the following frequency bands: 50 Hz to 400 Hz first-order, 400 Hz to 900 Hz second-order, and 900 Hz to 5 kHz third-order. The upper limit is determined by the TIA and the radius of the sphere of 5 cm. FIG. 12 shows the basic shape of the resulting filters $C_n(\omega)$, where the transitions are preferably smoothed out, which will also give a more constant WNG.

Maximizing the Directivity Index

This section describes a method to compute the coefficients C that result in a maximum achievable directivity index (DI). A constraint for the white noise gain (WNG) is included in the optimization.

The directivity index is defined as the ratio of the energy picked up by a directive microphone to the energy picked up by an omnidirectional microphone in an isotropic noise field, where both microphones have the same sensitivity towards the look direction. If the directive microphone is operated in a spherically isotropic noise field, the DI can be seen as the acoustical signal-to-noise improvement achieved by the directive microphone.

For an array, the DI can be written in matrix notation according to Equation (38) as follows:

$$DI = \frac{h^H G_0 G_0^H h}{h^H R h} = \frac{h^H P h}{h^H R h} \tag{38}$$

where the frequency dependence is omitted for better readability. The vector h contains the sensor weights at frequency $\omega_0$ according to Equation (39) as follows:

$$h=[h_0, h_1, h_2, \ldots, h_{M-1}]^T. \tag{39}$$

The superscript T denotes "transpose." $G_0$ is a vector describing the source array transfer function for the look direction at $\omega_0$. For a pressure sensor close to a rigid sphere, these values can be computed from Equation (6). R is the spatial cross-correlation matrix. The matrix elements are defined by Equation (40) as follows:

$$r_{pq} = \frac{1}{4\pi}\int_0^{2\pi}\int_0^{\pi} G(\vartheta_p, \varphi_p, r_p, a, \vartheta, \varphi, \omega_0) G(\vartheta_q, \varphi_q, r_q, a, \vartheta, \varphi, \omega_0) * \sin\vartheta d\vartheta d\varphi. \tag{40}$$

In matrix notation, the WNG is given by Equation (41) as follows:

$$WNG = \frac{h^H P h}{h^H h}. \tag{41}$$

The last required piece is to express the sensor weights using the coefficients $C_{nm}$. This is provided by Equation (27), which can again be written in matrix notation according to Equation (42) as follows:

$$h=Ac. \tag{42}$$

The vector c contains the spherical harmonic coefficients $C_{nm}$ for the beampattern design. This is the vector that has to be determined. According to Equations (27) and (19), the coefficients of A for the rigid sphere case with plane-wave incidence are given by Equation (43) as follows:

$$a_{sn} = \frac{Y_n(\vartheta_s, \varphi_s)}{i^n b_n(\omega_0, r_s, a)}. \tag{43}$$

The notation assumes that only the spherical harmonics of degree 0 are used for the pattern. If necessary, any other spherical harmonic can be included. The goal is now to maximize the DI with a constraint on the WNG. This is the same as minimizing the function 1/f, where the Lagrange multiplier $\epsilon$ is used to include the constraint, according to Equation (44) as follows:

$$\frac{1}{f} = \frac{1}{DI} + \varepsilon\frac{1}{WNG}. \tag{44}$$

One ends up with the following Equation (45), which has to be maximized with respect to the coefficient vector c:

$$f(c) = \frac{c^H A^H P A c}{c^H A^H (R + \varepsilon I) A c}, \tag{45}$$

where I is the unity matrix. Equation (45) is a generalized eigenvalue problem. Since A, R, and I are full rank, the solution is the eigenvector corresponding to Equation (46) as follows:

$$\max\{\lambda((A^H(R+\epsilon I)A)^{-1}(A^H P A))\}, \tag{46}$$

where $\lambda(\bullet)$ means "eigenvalue from." Unfortunately, Equation 45 cannot be solved for $\epsilon$. Therefore, one way to find the maximum DI for a desired WNG is as follows:

Step (1): Find the solution to Equation (46) for an arbitrary $\epsilon$.

Step (2): From the resulting vector c, compute the WNG.

Step (3): If the WNG is larger than desired, then return to Step (1) using a smaller $\epsilon$. If the WNG is too small, then return to Step (1) using a larger $\epsilon$. If the WNG matches the desired WNG, then the process is complete.

Notice that the choice of $\epsilon=0$ results in the maximum achievable DI. On the other hand, $\epsilon\to\infty$ results in a delay-and-sum beamformer. The latter one has the maximum achievable WNG, since all sensor signals will be summed up in phase, yielding the maximum output signal. f(c) depends monotonically on $\epsilon$.

Figure 13:
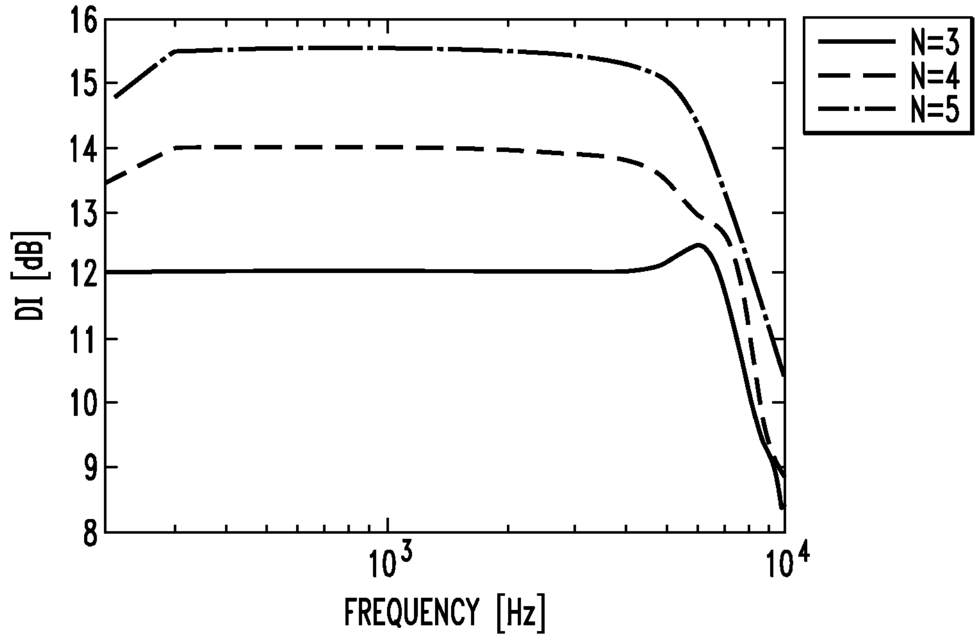
FIG. 13 shows the maximum directivity index (DI) for a sphere with a=5 cm, allowing spherical harmonics up to order N, where the WNG is arbitrary.
Figure 14:
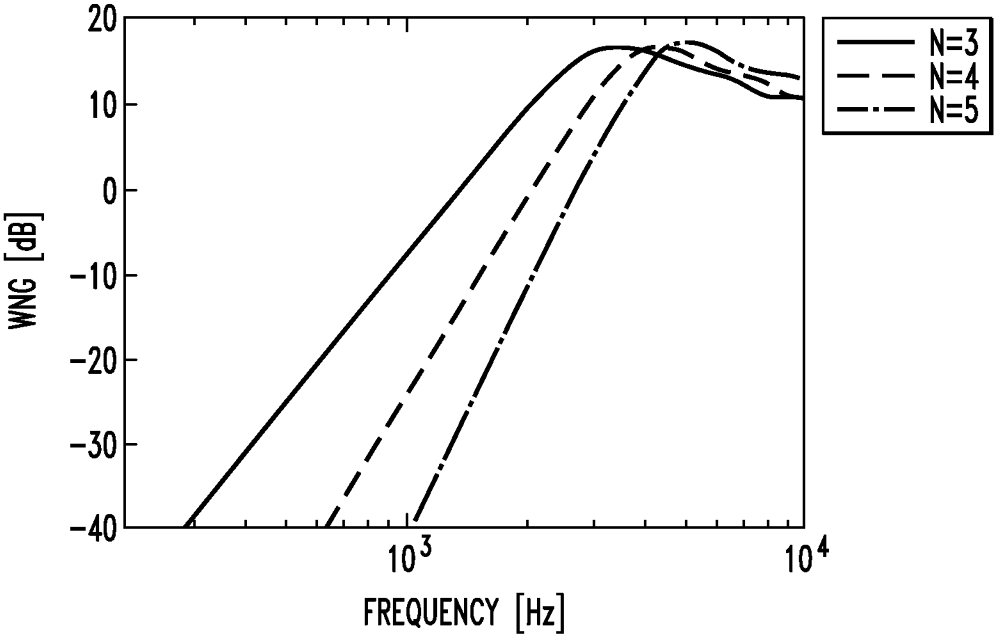
FIG. 14 shows the WNG corresponding to maximum DI from FIG. 13 for a sphere with a=5 cm.

FIG. 13 shows the maximum DI that can be achieved with the TIA using spherical harmonics up to order N without a constraint on the WNG. FIG. 14 shows the WNG corresponding to the maximum DI in FIG. 13. As long as the pattern is superdirectional, the WNG increases at about 6N dB per octave. The maximum WNG that can be achieved is about 10 log M, which for the TIA is about 15 dB. This is the value for an array in free field. In FIG. 14, for the sphere-baffled array, the maximum WNG is a bit higher, about 17 dB. Once the maximum is reached, it decreases. This is due to fact that the mode number in the array pattern is constant. Since the mode magnitude decreases once a mode has reached its maximum, the WNG is expected to decrease as soon as the highest mode has reached its maximum. For example, the third-order mode shows this for f≈3 kHz (compare FIG. 3A).

Figure 15:
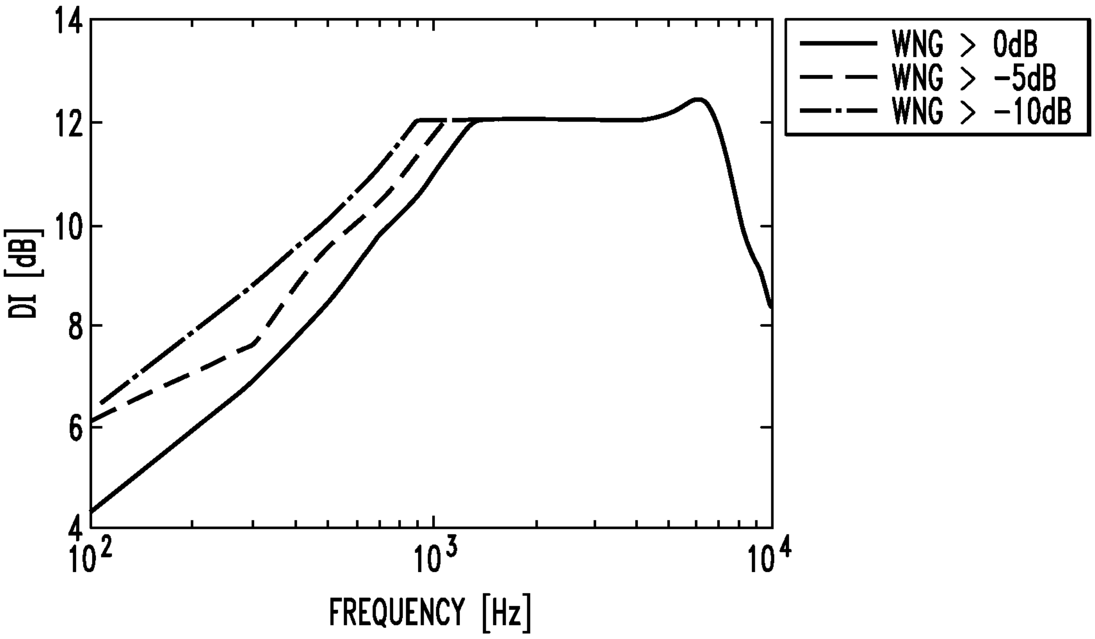
FIG. 15 shows the maximum DI with different constraints on the WNG for N=3.

FIG. 15 shows the maximum DI that can be achieved with a constraint on the WNG for a pattern that contains the spherical harmonics up to third order. Here, one can see the tradeoff between WNG and DI. The higher the required WNG, the lower the maximum DI, and vice versa. For a minimum WNG of −5 dB, one gets a constant DI of about 12 dB in a frequency band from about 1 kHz to about 5 kHz. Between 100 Hz and 1 kHz, the DI increases from about 6 dB to about 12 dB.

Figure 16A:
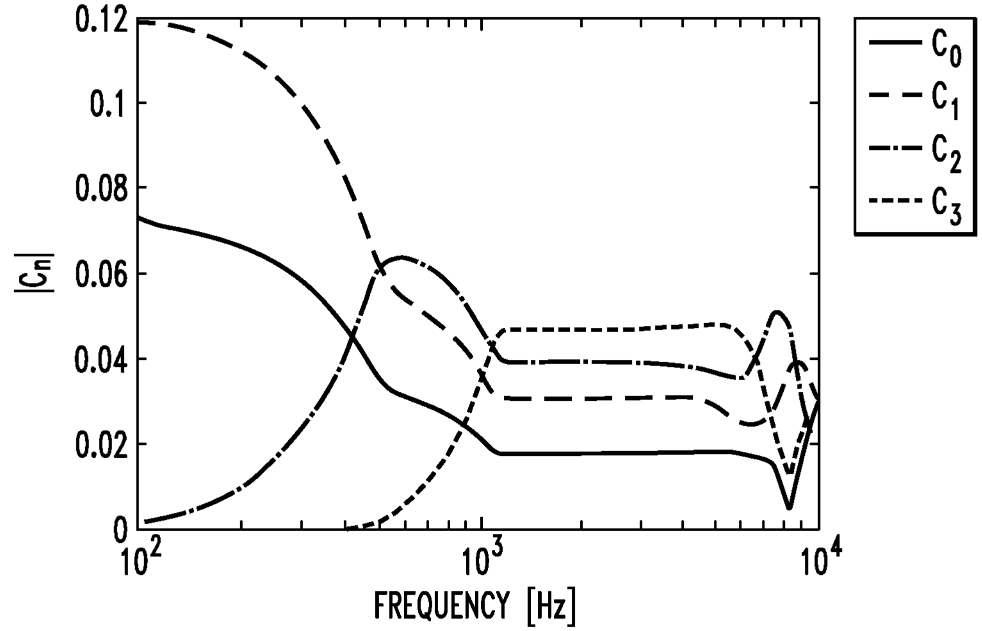
FIGS. 16A-B show coefficients $C_n(\omega)$ for maximum DI design with N=3 and WNG≧−5.
Figure 16B:
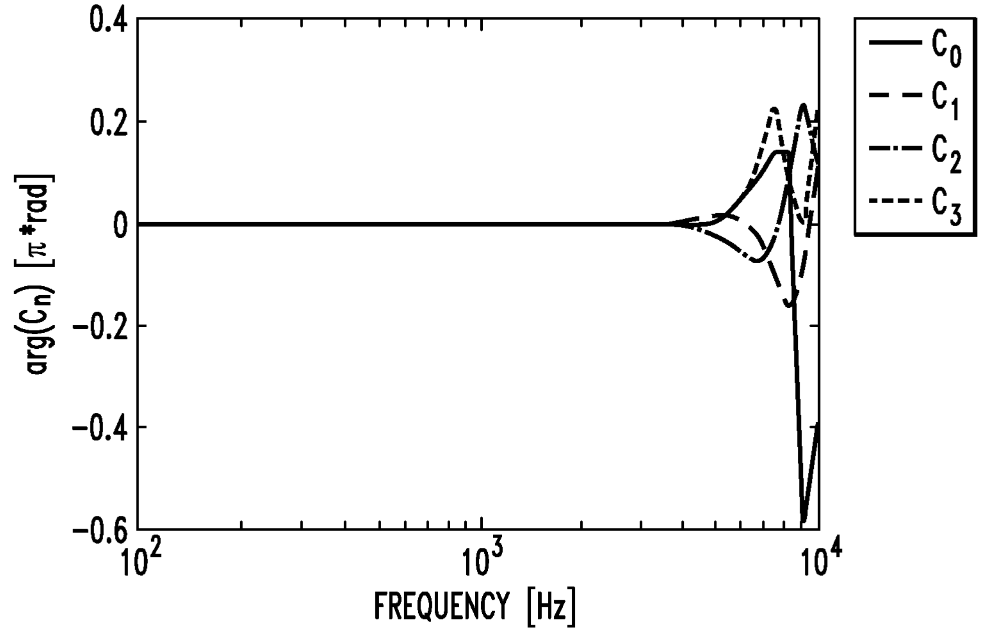

FIGS. 16A-B give the magnitude and phase, respectively, of the coefficients computed according to the procedure described above in this section, where N was set to 3, and the minimum required WNG was about −5 dB. Coefficients are normalized so that the array factor for the look direction is unity. Comparing the coefficients from FIGS. 16A-B with the coefficients from FIG. 12, one finds that they are basically the same. Only the band transitions are more precise in FIGS. 16A-B in order to keep the WNG constant.

Rotating the Directivity Pattern

After the pattern is generated for the look direction θ=0, it is relatively straightforward to turn it to a desired direction. Using Equation (27), the weights for a ϕ-symmetric pattern are given by Equation (47) as follows:

$$h_s(\omega) = \sum_{n=0}^{N} C_n(\omega) Y_n(\vartheta_s, \varphi_s) = \sum_{n=0}^{N} C_n(\omega) \sqrt{\frac{2n+1}{4\pi}}\, P_n(\cos\vartheta_s) \tag{47}$$

Substituting Equation (3) in Equation (47), one ends up with Equation (48) as follows:

$$h_s(\omega) = \sum_{n=0}^{N} C_n(\omega) \sqrt{\frac{2n+1}{4\pi}} \sum_{m=-n}^{n} \frac{(n-m)!}{(n+m)!} P_n^m(\cos\vartheta_s) P_n^m(\cos\vartheta_0) e^{im(\varphi_s-\varphi_0)} = \sum_{n=0}^{N}\sum_{m=-n}^{n} C_n(\omega) \sqrt{\frac{(n-m)!}{(n+m)!}}\, P_n^m(\cos\vartheta_0) e^{-im\varphi_0} Y_n^m(\vartheta_s, \varphi_s) \tag{48}$$

Comparing Equation (48) with Equation (27), one yields for the new coefficients Equation (49) as follows:

$$C'_{nm}(\omega) = C_n(\omega) \sqrt{\frac{(n-m)!}{(n+m)!}}\, P_n^m(\cos\vartheta_0) e^{-im\varphi_0} \tag{49}$$

Equation (49) enables control of the θ and ϕ directions independently. Also the pattern itself can be implemented independently from the desired look direction.

Implementation of the Beamformer

This section provides a layout for the beamformer based on the theory described in the previous sections. Of course, the spherical array can be implemented using a filter-and-sum beamformer as indicated in Equation (28). The filter-and-sum approach has the advantage of utilizing a standard technique. Since the spherical array has a high degree of symmetry, rotation can be performed by shifting the filters. For example, the TIA can be divided into 60 very similar triangles. Only one set of filters is computed with a look direction normal to the center of one triangle. Assigning the filters to different sensors allows steering the array to 60 different directions.

Alternatively, a scheme based on the structure of the modal beamformer of FIG. 1 may be implemented. This yields significant advantages for the implementation. Combining Equations (27), (28), and (49), an expression for the array output is given by Equation (50) as follows:

$$F(\vartheta, \varphi, \omega) = \sum_{s=0}^{M-1}\sum_{n=0}^{\infty}\sum_{m=-n}^{n} C_n(\omega) \sqrt{\frac{(n-m)!}{(n+m)!}}\, P_n^m(\cos\vartheta_0) e^{-im\varphi_0} Y_n^m(\vartheta_s, \varphi_s)\, G(\vartheta_s, \varphi_s, r_s, \vartheta, \varphi, \omega). \tag{50}$$

Figure 17:
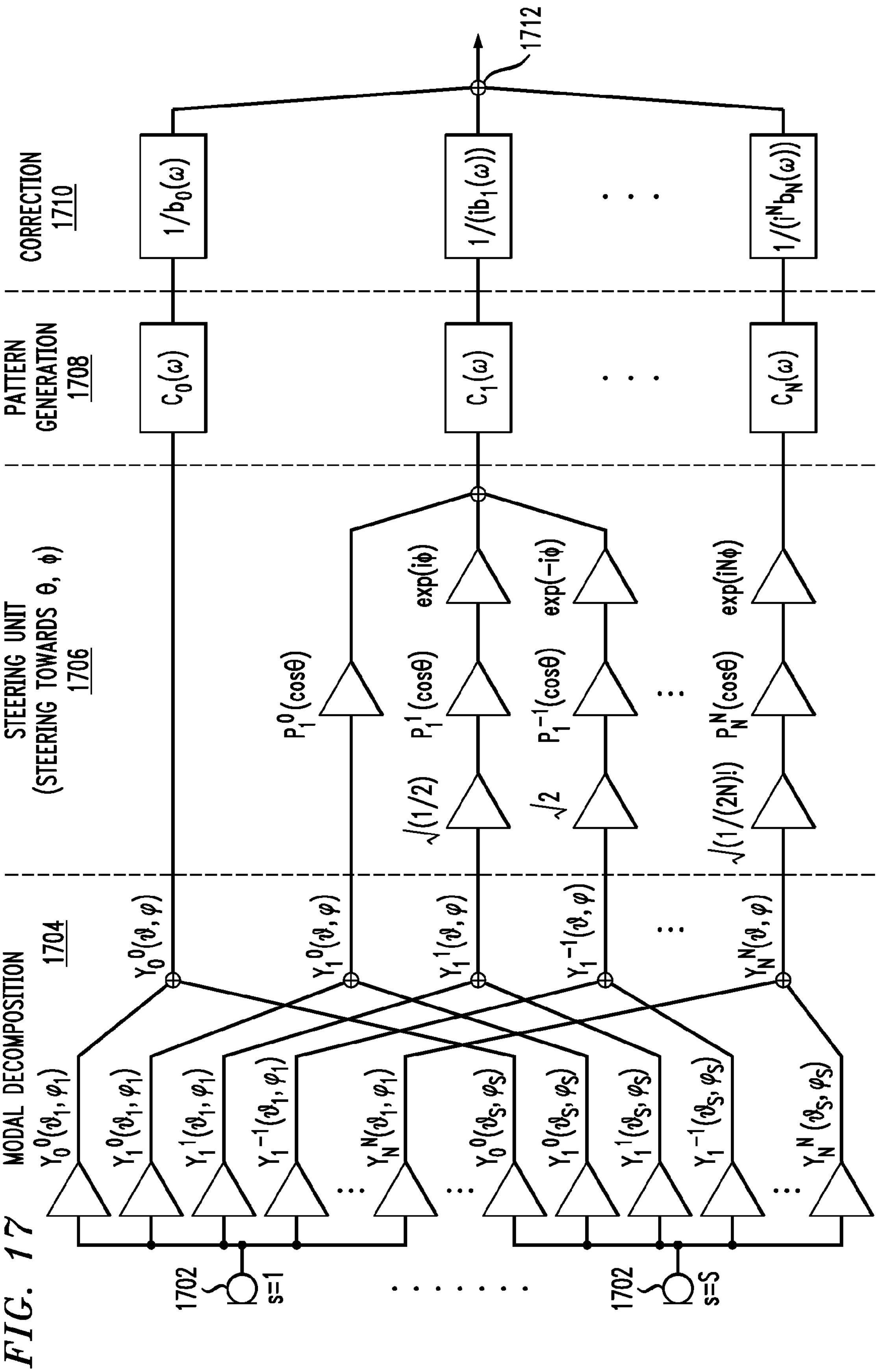
FIG. 17 provides a generalized representation of audio systems of the present invention.

Referring again to FIG. 1, audio system 100 is a second-order system. It is straightforward to extend this to any order. FIG. 17 provides a generalized representation of audio systems of the present invention. Decomposer 1704, corresponding to decomposer 104 of FIG. 1, performs the orthogonal modal decomposition of the sound field measured by sensors 1702. In FIG. 17, the beamformer is represented by steering unit 1706 followed by pattern generation 1708 followed by frequency response correction 1710 followed by summation node 1712. Note that, in general, not all of the available eigenbeam outputs have to be used when generating an auditory scene.

In audio system 100 of FIG. 1, decomposer 104 receives audio signals from S different sensors 102 (preferably configured on an acoustically rigid sphere) and generates nine different eigenbeam outputs corresponding to the zero-order (n=0), first-order (n=1), and second-order (n=2) spherical harmonics. As represented in FIG. 1, beamformer 106 comprises steering unit 108, compensation unit 110, and summation unit 112. In this particular implementation, the frequency-response correction of compensation unit 110 is applied prior to pattern generation, which is implemented by summation unit 112. This differs from the representation in FIG. 17 in which correction unit 1710 performs frequency-response correction after pattern generation 1708. Either implementation is viable. In fact, it is also possible and possibly advantageous to have the correction unit before the steering unit. In general, any order of steering unit, pattern generation, and correction is possible.

Modal Decomposer

Decomposer 104 of FIG. 1 is responsible for decomposing the sound field, which is picked up by the microphones, into the nine different eigenbeam outputs corresponding to the zero-order (n=0), first-order (n=1), and second-order (n=2) spherical harmonics. This can also be seen as a transformation, where the sound field is transformed from the time or frequency domain into the "modal domain." The mathematical analysis of the decomposition was discussed previously for complex spherical harmonics. To simplify a time domain implementation, one can also work with the real and imaginary parts of the spherical harmonics. This will result in real-valued coefficients which are more suitable for a time-domain implementation. For a continuous spherical sensor with angle-dependent sensitivity M given by Equation (51) as follows:

$$M = \mathrm{Re}\{Y_n^m(\vartheta, \varphi)\} = \frac{1}{2}\begin{cases} (Y_n^m(\vartheta, \varphi) + Y_n^{-m}(\vartheta, \varphi)) & \text{for } m \text{ even} \\ (Y_n^m(\vartheta, \varphi) - Y_n^{-m}(\vartheta, \varphi)) & \text{for } m \text{ odd,} \end{cases} \tag{51}$$

the array output F given by Equation (52) as follows:

$$F_{n'm'}(\theta,\phi) = 4\pi i^{n'} b_{n'}(ka)\mathrm{Re}\{Y_{m'}^{m'}(\theta,\phi)\} \tag{52}$$

If the sensitivity equals the imaginary part of a spherical harmonic, then the beampattern of the corresponding array factor will also be the imaginary part of this spherical harmonic. The output spherical harmonic is frequency weighted. To compensate for this frequency dependence, compensation unit 110 of FIG. 1 may be implemented as described below in conjunction with FIG. 20.

For a practical implementation, the continuous spherical sensor is replaced by a discrete spherical array. In this case, the integrals in the equations become sums. As before, the sensor should substantially satisfy (as close as practicable) the orthonormality property given by Equation (53) as follows:

$$\delta_{n-n',m-m'} = \frac{4\pi}{S}\sum_{s=1}^{S} Y_n^{m*}(\vartheta_s,\varphi_s)Y_{n'}^{m'}(\vartheta_s,\varphi_s), \quad (53)$$

where S is the number of sensors, and $[\theta_s, \phi_s]$ describes their positions $p_s$. If the right side of Equation (53) does not result to unity for n=n' and m=m', then a simple scaling weight should be inserted to compensate this error. In general, for a spheroidal array, the orthonormality property can be represented as follows:

$$\delta_{n-n',m-m'} \approx \frac{4\pi}{S}\sum_{s=1}^{S} Y_n^{m*}(p_s)Y_{n'}^{m'}(p_s).$$

Figure 18:
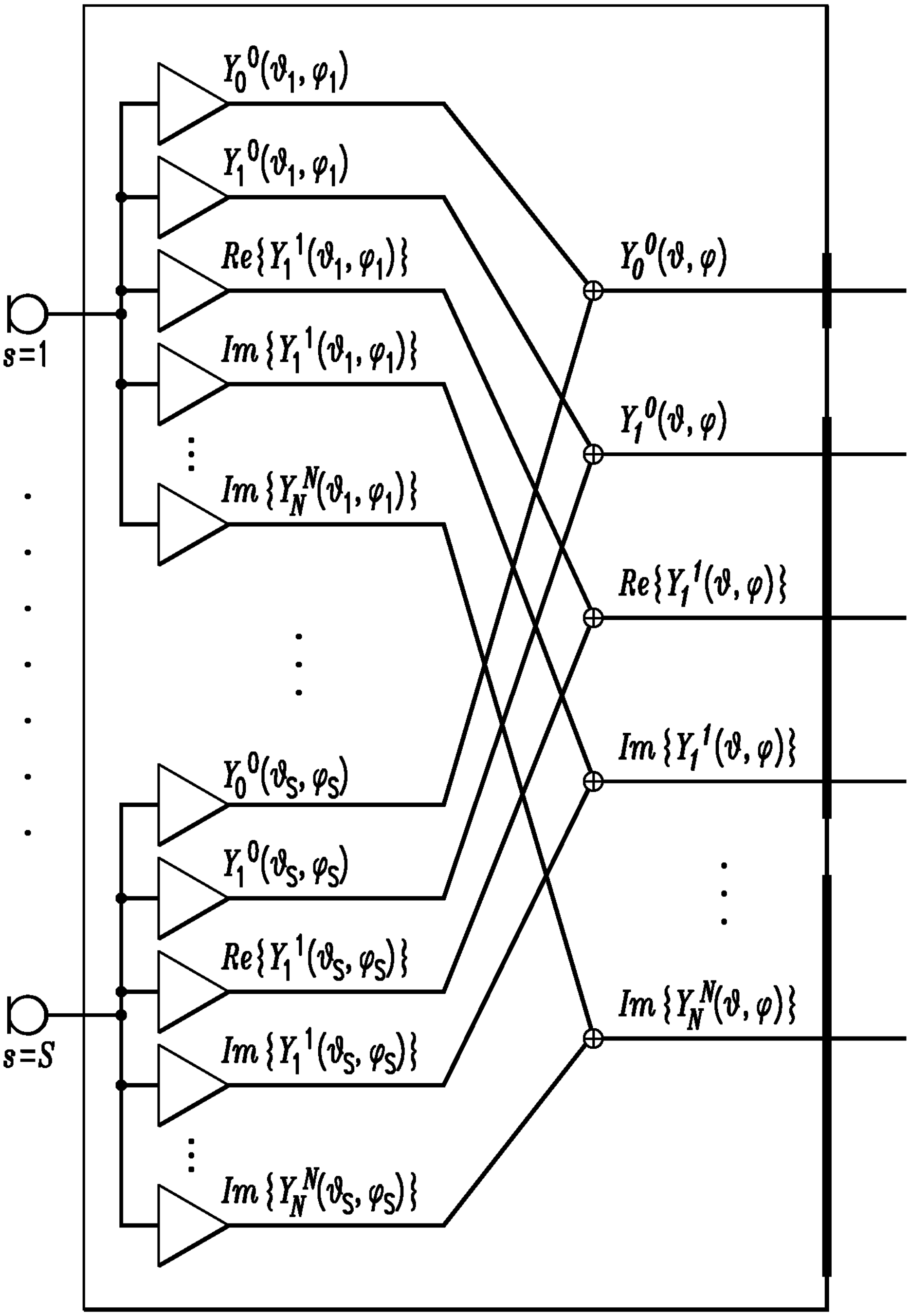
FIG. 18 represents the structure of an eigenbeam former, such as the generic decomposer of FIG. 17 and the second-order decomposer of FIG. 1.

FIG. 18 represents the structure of an eigenbeam former, such as generic decomposer 1704 of FIG. 17 and second-order decomposer 104 of FIG. 1. Decomposers can be conveniently described using matrix notation according to Equation (54) as follows:

$$f_d = Ys, \quad (54)$$

where $f_d$ describes the output of the decomposer, s is a vector containing the sensor signals, and Y is a $(2N+1)^2\times S$ matrix, where N is the highest order in the spherical harmonic expansion. The columns of Y give the real and imaginary parts of the spherical harmonics for the corresponding sensor position. Table 2 shows the convention that is used for numbering the rows of matrix Y up to fifth-order spherical harmonics, where n corresponds to the order of the spherical harmonic, m corresponds to the degree of the spherical harmonic, and the label nm identifies the row number. For a fifth-order expansion, matrix Y has $(2N+1)^2$ or 36 rows, labeled in Table 2 from nm=0 to nm=35. For example, as indicated in Table 2, Row nm=21 in matrix Y corresponds to the real part (Re) of the spherical harmonic of order (n=4) and degree (m=3), while Row nm=22 corresponds to the imaginary part (Im) of that same spherical harmonic. Note that the zero-degree (m=0) spherical harmonics have only real parts.

TABLE 2

Numbering scheme used for the rows of matrix Y

| | | | | | | | | | |
|---|---|---|---|---|---|---|---|---|---|
| n | 0 | 1 | 1 | 1 | 2 | 2 | 2 | 2 | 2 |
| m | 0 | 0 | 1 (Re) | 1 (Im) | 0 | 1 (Re) | 1 (Im) | 2 (Re) | 2 (Im) |
| nm | 0 | 1 | 2 | 3 | 4 | 5 | 6 | 7 | 8 |
| n | 3 | 3 | 3 | 3 | 3 | 3 | 3 | 4 | 4 |
| m | 0 | 1 (Re) | 1 (Im) | 2 (Re) | 2 (Im) | 3 (Re) | 3 (Im) | 0 | 1 (Re) |
| nm | 9 | 10 | 11 | 12 | 13 | 14 | 15 | 16 | 17 |
| n | 4 | 4 | 4 | 4 | 4 | 4 | 4 | 5 | 5 |
| m | 1 (Im) | 2 (Re) | 2 (Im) | 3 (Re) | 3 (Im) | 4 (Re) | 4 (Im) | 0 | 1 (Re) |
| nm | 18 | 19 | 20 | 21 | 22 | 23 | 24 | 25 | 26 |
| n | 5 | 5 | 5 | 5 | 5 | 5 | 5 | 5 | 5 |
| m | 1 (Im) | 2 (Re) | 2 (Im) | 3 (Re) | 3 (Im) | 4 (Re) | 4 (Im) | 5 (Re) | 5 (Im) |
| nm | 27 | 28 | 29 | 30 | 31 | 32 | 33 | 34 | 35 |

Steering Unit

Figure 19:
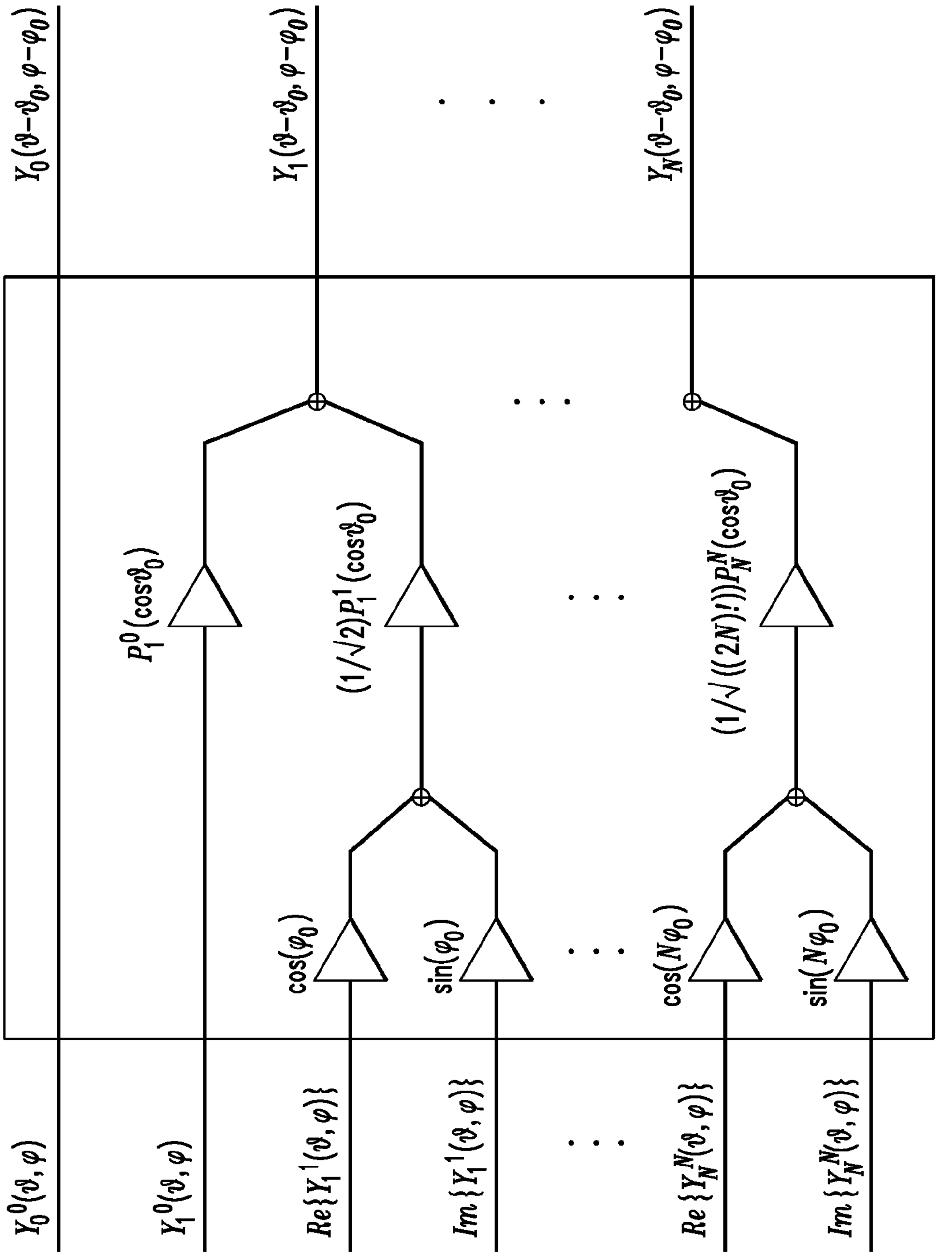
FIG. 19 represents the structure of steering units, such as the generic steering unit of FIG. 17 and the second-order steering unit of FIG. 1.

FIG. 19 represents the structure of steering units, such as generic steering unit 1706 of FIG. 17 and second-order steering unit 108 of FIG. 1. Steering units are responsible for steering the look direction by $[\theta_0, \phi_0]$. The mathematical description of the output of a steering unit for the $n^{th}$ order is given by Equation (55) as follows:

$$Y_n(\vartheta-\vartheta_0,\varphi-\varphi_0) = \sqrt{\frac{(n-m)!}{(n-m)!}}P_n^m(\cos(\vartheta_0))\ \ldots \quad (55)$$
$$(\cos(m\varphi_0)\mathrm{Re}\{Y_n^m(\vartheta,\varphi)\} + \sin(m\varphi_0)\mathrm{Im}\{Y_n^m(\vartheta,\varphi)\})$$

Compensation Unit

As described previously, the output of the decomposer is frequency dependent. Frequency-response correction, as performed by generic correction unit 1710 of FIG. 17 and second-order compensation unit 110 of FIG. 1, adjusts for this frequency dependence to get a frequency-independent representation of the spherical harmonics that can be used, e.g., by generic summation node 1712 of FIG. 17 and second-order summation unit 112 of FIG. 1, in generating the beampattern.

Figure 20A:
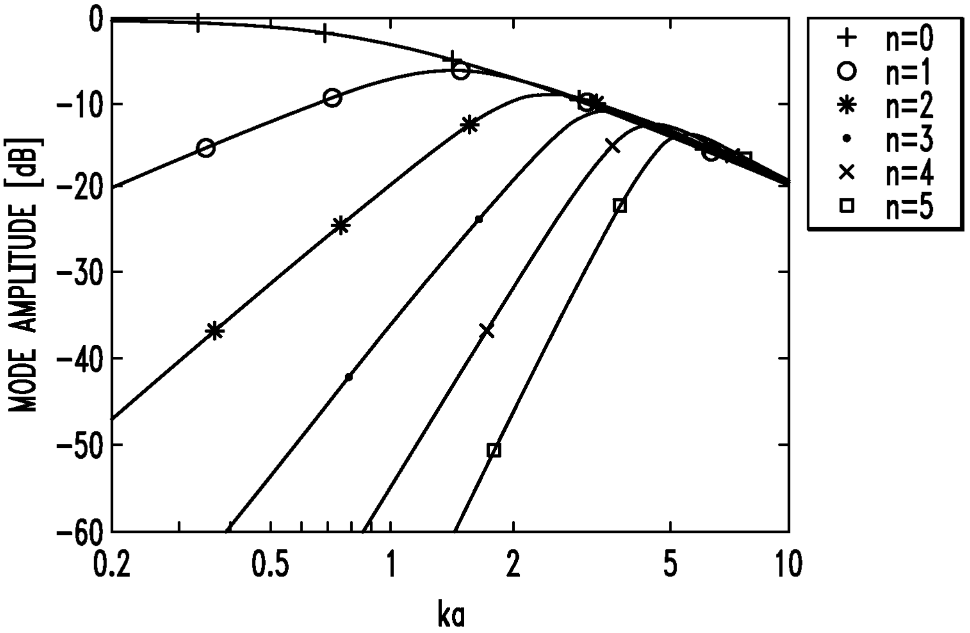
Figure 20B:
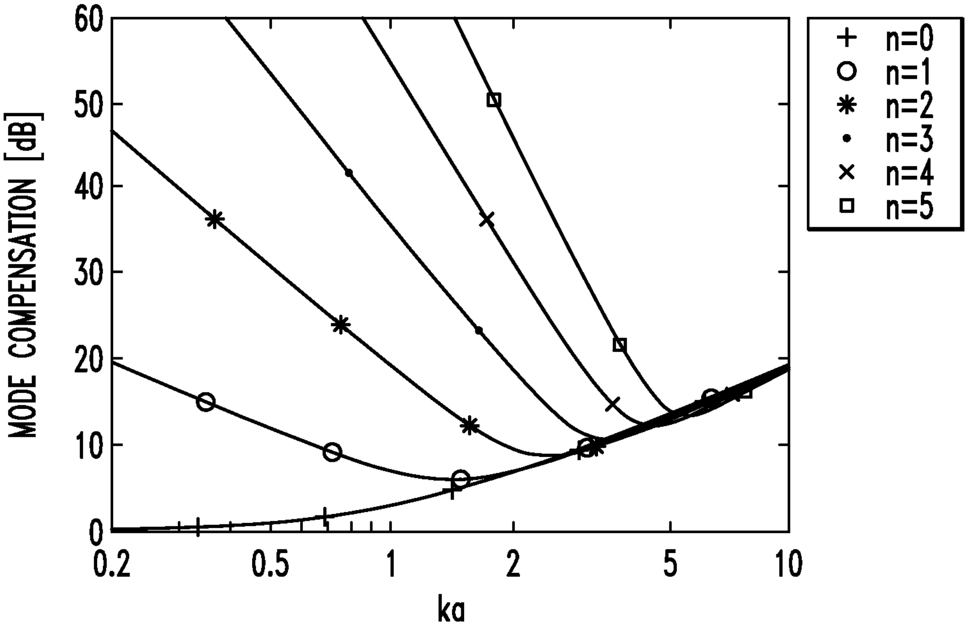
FIG. 20B shows the corresponding frequency response correction that should be applied by the compensation unit of FIG. 1.

FIG. 20A shows the frequency-weighting function of the decomposer output, while FIG. 20B shows the corresponding frequency-response correction that should be applied, where the frequency-response correction is simply the inverse of the frequency-weighting function. In this case, the transfer function for frequency-response correction may be implemented as a band-stop filter comprising a first-order high-pass filter configured in parallel with an n-order low-pass filter, where n is the order of the corresponding spherical harmonic output. At low ka, the gain has to be limited to a reasonable factor. Also note that FIG. 20 only shows the magnitude; the corresponding phase can be found from Equation (19).

Summation Unit

Summation unit 112 of FIG. 1 performs the actual beamforming for system 100. Summation unit 112 weights each harmonic by a frequency response and then sums up the weighted harmonics to yield the beamformer output (i.e., the auditory scene). This is equivalent to the processing represented by pattern generation unit 1708 and summation node 1712 of FIG. 17.

Choosing the Array Parameters

The three major design parameters for a spherical microphone array are:

The number of audio sensors (S);

The radius of the sphere (a); and

The location of the sensors.

The parameters S and a determine the array properties of which the most important ones are:

The white noise gain (WNG), which indirectly specifies the lower end of the operating frequency range;

The upper frequency limit, which is determined by spatial aliasing; and

The maximum order of the beampattern (spherical harmonic) that can be realized with the array (this is also dependent on the WNG). This will also determine the maximum directivity that can be achieved with the array.

From a performance point of view, the best choices are big spheres with large numbers of sensors. However, the number of sensors may be restricted in a real-time implementation by the ability of the hardware to perform the required processing on all of the signals from the various sensors in real time. Moreover, the number of sensors may be effectively limited by the capacity of available hardware. For example, the availability of 32-channel processors (24-channel processors for mobile applications) may impose a practical limit on the number of sensors in the microphone array. The following sections will give some guidance to the design of a practical system.

Upper Frequency Limit

In order to find the upper frequency limit, depending on a and S, the approximation of Equation (56), which is based on the sampling theorem, can be used as follows:

$$f_{max} = \frac{c}{2\sqrt{\frac{4\pi a^2}{S}\frac{4}{\pi}}} \tag{56}$$

Figure 21:
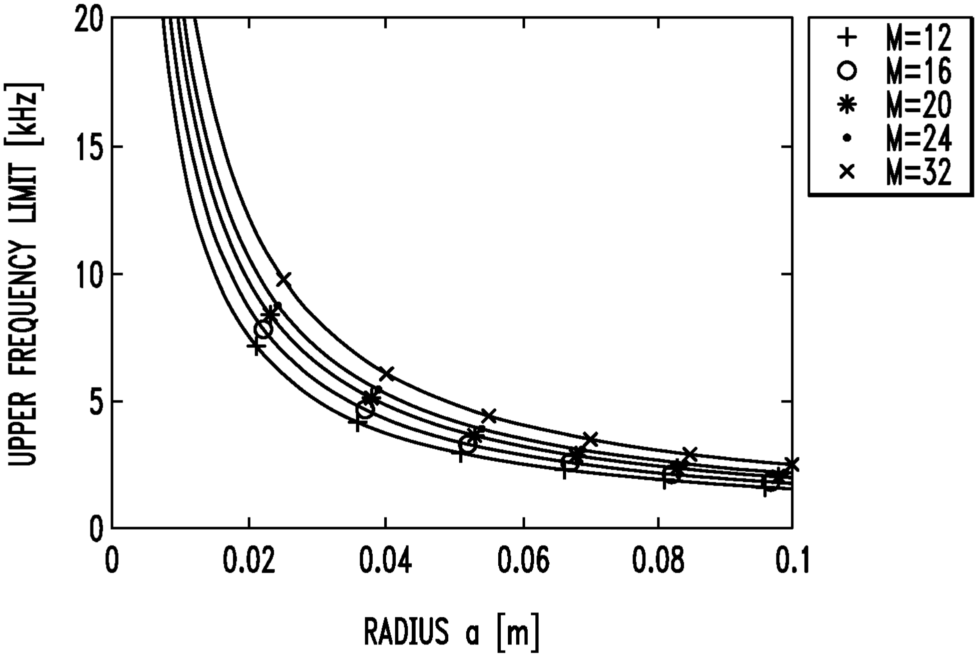
FIG. 21 shows a graphical representation of Equation (61)

The square-root term gives the approximate sensor distance, assuming the sensors are equally distributed and positioned in the center of a circular area. The speed of sound is c. FIG. 21 shows a graphical representation of Equation (56), representing the maximum frequency for no spatial aliasing as a function of the radius. This figure gives an idea of which radius to choose in order to get a desired upper frequency limit for a given number of sensors. Note that this is only an approximation.

Maximum Directivity Index

The minimum number of sensors required to pick up all harmonic components is $(N+1)^2$, where N is the order of the pattern. This means that, for a second-order array, at least nine elements are needed and, for a third-order array, at least 16 sensors are needed to pick up all harmonic components. These numbers assume the ability to generate an arbitrary beampattern of the given order. If the beampatterns can be restricted somehow, e.g., the look direction is fixed or needs to be steered only in one plane, then the number of sensors can be reduced since, in those situations, all of the harmonic components (i.e., the full set of eigenbeams) are not needed.

Robustness Measure

A general expression of the white noise gain (WNG) as a function of the number of microphones and radius of the sphere cannot be given, since it depends on the sensor locations and, to a great extent, on the beampattern. If the beampattern consists of only a single spherical harmonic, then an approximation of the WNG is given by Equation (57) as follows:

$$\mathrm{WNG}(a,S,f)S^2|b_n(a,f)|^2 \tag{57}$$

The factor $b_n$ represents the mode strength (see FIG. 20A). The above proportionality is also valid if the array is operated in a superdirectional mode, meaning that the strength of the highest harmonic is significantly less than the strength of the lower-order harmonics. This is a typical operational mode at lower frequencies.

Table 3 shows the gain that is achieved due to the number of sensors. It can be seen that the gain in general is quite significant, but increases by only 6 dB when the number of sensors is doubled.

TABLE 3

WNG due to the number of microphones.

| | S | | | | |
|---|---|---|---|---|---|
| | 12 | 16 | 20 | 24 | 32 |
| 20log(S) [dB] | 22 | 24 | 26 | 28 | 30 |

Figure 22A:
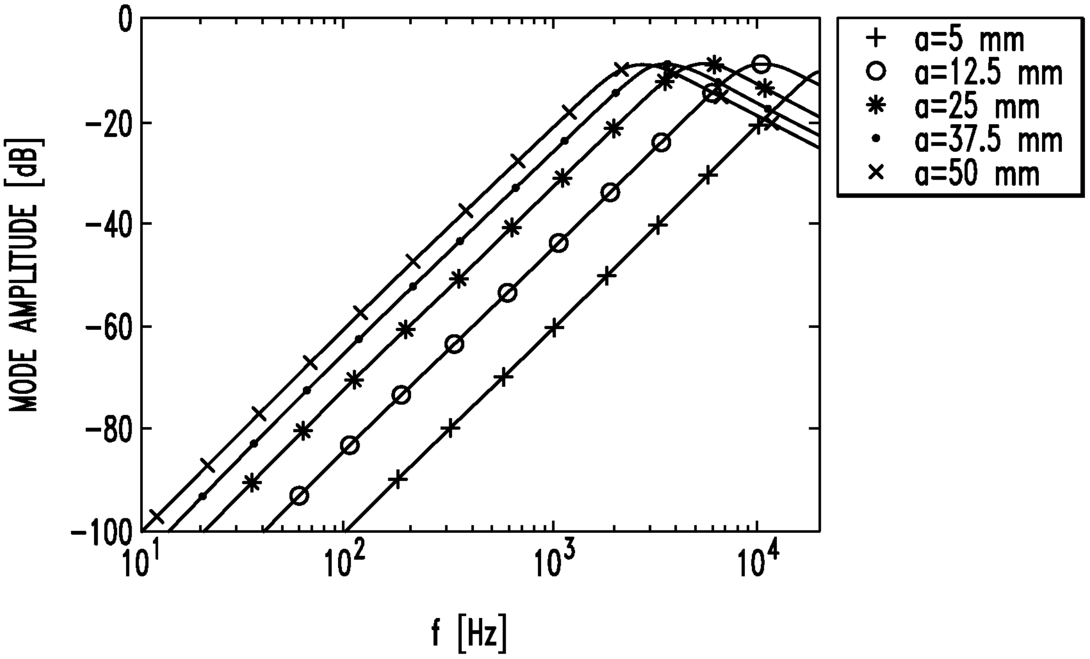
FIGS. 22A and 22B show mode strength for second-order and third-order modes, respectively.
Figure 22B:
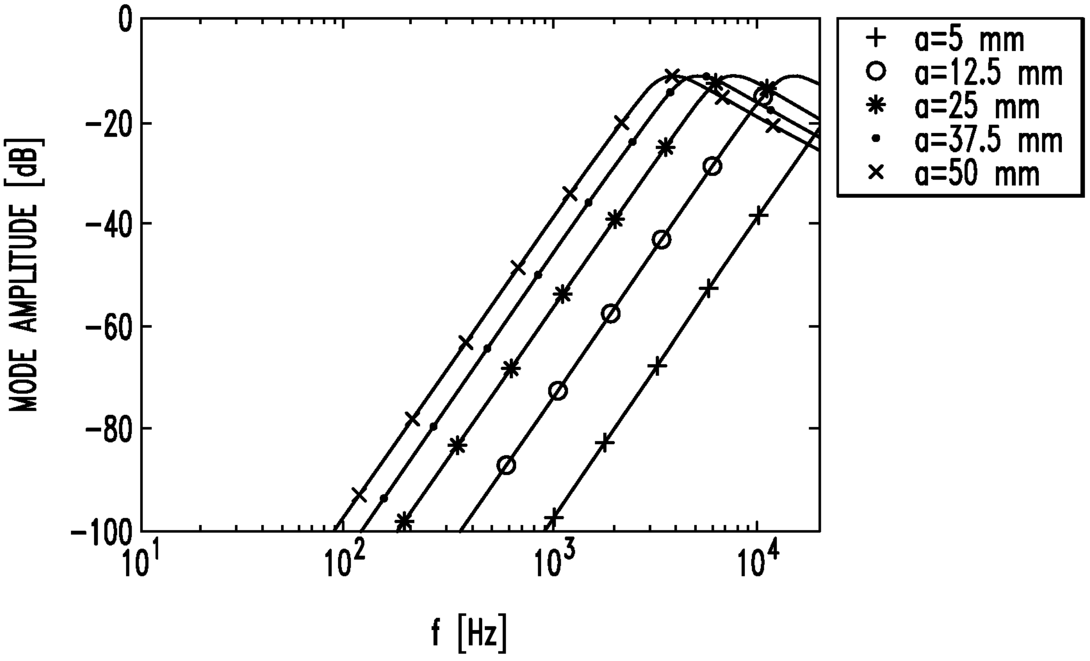

FIGS. 22A and 22B show mode strength for second-order and third-order modes, respectively. In particular, the figures show the mode strength as a function of frequency for five different array radii from 5 mm to 50 mm. According to Equation (57), this mode strength is directly proportional to the WNG, where the WNG is proportional to the radius squared. This means that the radius should be chosen as large as possible to achieve a good WNG in order achieve a high directivity at low frequencies.

Preferred Array Parameters

To provide all beampatterns up to order three, the minimum number of sensors is 16. For a mobile (e.g., laptop) real-time solution, given currently available hardware, the maximum number of sensors is assumed to be 24. For an upper frequency limit of at least 5 kHz, the radius of the sphere should be no larger than about 4 cm. On the other hand, it should not be much smaller because of the WNG. A good compromise seems to be an array with 20 sensors on a sphere with radius of 37.5 mm (about 1.5 inches). A good choice for the sensor locations is the center of the faces of an icosahedron, which would result in regular sensor spacing on the surface of the sphere. Table 4 identifies the sensor locations for one possible implementation of the icosahedron sampling scheme. Another configuration would involve 24 sensors arranged in an “extended icosahedron” scheme. Table 5 identifies the sensor locations for one possible implementation of the extended icosahedron sampling scheme. Another possible configuration is based on a truncated icosahedron scheme of FIG. 9. Since this scheme involves 32 sensors, it might not be practical for some applications (e.g., mobile solutions) where available processors cannot support 32 incoming audio signals. Table 6 identifies the sensor locations for one possible six-element spherical array, and Table 7 identifies the sensor locations for one possible four-element spherical array.

TABLE 4

Locations for a 20-element icosahedron spherical array

| Sensor # | ϕ [°] | θ [°] | α [mm] |
|---|---|---|---|
| 1 | 108 | 37.38 | 37.5 |
| 2 | 180 | 37.38 | 37.5 |
| 3 | 252 | 37.38 | 37.5 |
| 4 | −36 | 37.38 | 37.5 |
| 5 | 36 | 37.38 | 37.5 |
| 6 | −72 | 142.62 | 37.5 |
| 7 | 0 | 142.62 | 37.5 |
| 8 | 72 | 142.62 | 37.5 |
| 9 | 144 | 142.62 | 37.5 |
| 10 | 216 | 142.62 | 37.5 |
| 11 | 108 | 79.2 | 37.5 |
| 12 | 180 | 79.2 | 37.5 |
| 13 | 252 | 79.2 | 37.5 |
| 14 | −36 | 79.2 | 37.5 |
| 15 | 36 | 79.2 | 37.5 |
| 16 | −72 | 100.8 | 37.5 |
| 17 | 0 | 100.8 | 37.5 |
| 18 | 72 | 100.8 | 37.5 |
| 19 | 144 | 100.8 | 37.5 |
| 20 | 216 | 100.8 | 37.5 |

TABLE 5

| Locations for a 24-element "extended icosahedron" spherical array | | | |
|---|---|---|---|
| Sensor # | φ [°] | θ [°] | α [mm] |
| 1 | 0 | 37.38 | 37.5 |
| 2 | 60 | 37.38 | 37.5 |
| 3 | 120 | 37.38 | 37.5 |
| 4 | 180 | 37.38 | 37.5 |
| 5 | 240 | 37.38 | 37.5 |
| 6 | 300 | 37.38 | 37.5 |
| 7 | 0 | 79.2 | 37.5 |
| 8 | 60 | 79.2 | 37.5 |
| 9 | 120 | 79.2 | 37.5 |
| 10 | 180 | 79.2 | 37.5 |
| 11 | 240 | 79.2 | 37.5 |
| 12 | 300 | 79.2 | 37.5 |
| 13 | 30 | 100.8 | 37.5 |
| 14 | 90 | 100.8 | 37.5 |
| 15 | 150 | 100.8 | 37.5 |
| 16 | 210 | 100.8 | 37.5 |
| 17 | 270 | 100.8 | 37.5 |
| 18 | 330 | 100.8 | 37.5 |
| 19 | 30 | 142.62 | 37.5 |
| 20 | 90 | 142.62 | 37.5 |
| 21 | 150 | 142.62 | 37.5 |
| 22 | 210 | 142.62 | 37.5 |
| 23 | 270 | 142.62 | 37.5 |
| 24 | 330 | 142.62 | 37.5 |

TABLE 6

| Locations for a six-element icosahedron spherical array | | | |
|---|---|---|---|
| Sensor # | φ [°] | θ [°] | α [mm] |
| 1 | 0 | 90 | 10 |
| 2 | 90 | 90 | 10 |
| 3 | 180 | 90 | 10 |
| 4 | 270 | 90 | 10 |
| 5 | 0 | 0 | 10 |
| 6 | 0 | 180 | 10 |

TABLE 7

| Locations for a four-element icosahedron spherical array | | | |
|---|---|---|---|
| Sensor # | φ [°] | θ [°] | α [mm] |
| 1 | 0 | 0 | 10 |
| 2 | 0 | 109.5 | 10 |
| 3 | 120 | 109.5 | 10 |
| 4 | 240 | 109.5 | 10 |

One problem that exists to at least some extent with each of these configurations relates to spatial aliasing. At higher frequencies, a continuous sound field cannot be uniquely represented by a finite number of sensors. This causes a violation of the discrete orthonormality property that was discussed previously. As a result, the eigenbeam representation becomes problematic. This problem can be overcome by using sensors that integrate the acoustic pressure over a predefined aperture. This integration can be characterized as a "spatial low-pass filter."

Spherical Array with Integrating Sensors

Spatial aliasing is a serious problem that causes a limitation of usable bandwidth. To address this problem, a modal low-pass filter may be employed as an anti-aliasing filter. Since this would suppress higher-order modes, the frequency range can be extended. The new upper frequency limit would then be caused by other factors, such as the computational capability of the hardware, the A/D conversion, or the "roundness" of the sphere.

One way to implement a modal low-pass filter is to use microphones with large membranes. These microphones act as a spatial low-pass filter. For example, in free field, the directional response of a microphone with a circular piston in an infinite baffle is given by Equation (58) as follows:

$$F(ka\sin\vartheta) = \frac{2J_1(ka\sin\vartheta)}{ka\sin\vartheta}, \tag{58}$$

where J is the Bessel function, a is the radius of the piston, and θ is the angle off-axis. This is referred to as a spatial low-pass filter since, for small arguments (ka sin θ<<1), the sensitivity is high, while, for large arguments, the sensitivity goes to zero. This means, that only sound from a limited region is recorded. Generally this behavior is true for pressure sensors with a significant (relative to the acoustic wavelength) membrane size. The following provides a derivation for an expression for a conformal patch microphone on the surface of a rigid sphere.

The microphone output M will be the integration of the sound pressure over the microphone area. Assuming a constant microphone sensitivity $m_0$ over the microphone area, the microphone output M is then given by Equation (59) as follows:

$$M(\vartheta, \varphi, k, a) = m_0 \int\int_{\Omega_s} G(\vartheta, \varphi, k, a, \vartheta_s, \varphi_s) d\Omega_s, \tag{59}$$

where $\Omega_s$ symbolizes the integration over the microphone area, and G is the sound pressure at location $[\theta_s, \phi_s]$ on the surface of the sphere caused by plane wave incidence from direction [θ, φ], assuming plane wave incidence with unity magnitude. Simplifying Equation (59) yields Equation (60) as follows:

$$M_{nm}(\vartheta_0, a, m_0) = \begin{cases} a^2 m_0 \sqrt{\pi}(1-\cos\vartheta_0) & \text{for } n=0 \\ a^2 m_0 \sqrt{\frac{\pi}{(2n+1)}} \begin{pmatrix} P_{n-1}(\cos\vartheta_0) - \\ P_{n+1}(\cos\vartheta_0) \end{pmatrix} & \text{for } n \neq 0 \end{cases} \tag{60}$$

Figure 22C:
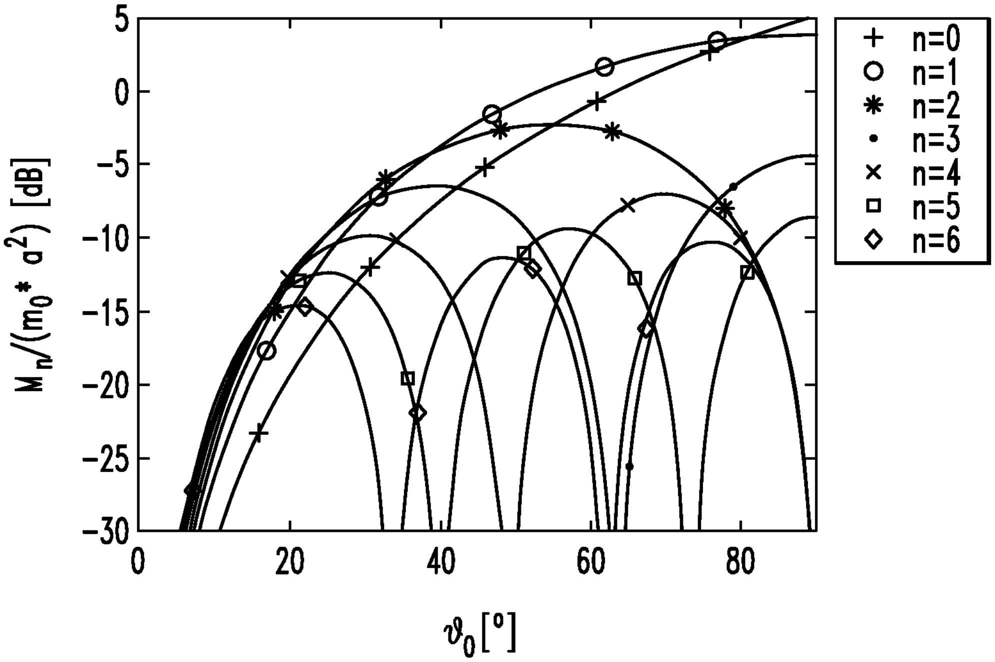
FIG. 22C graphically represents normalized sensitivity of a circular patch-microphone to a spherical mode of order n.
Figure 23A:
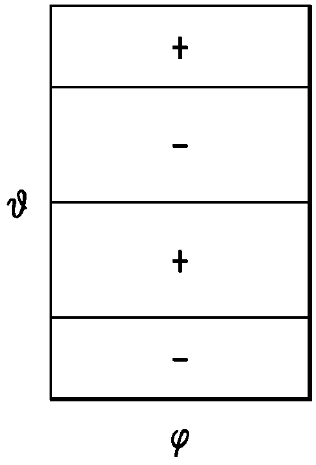
FIGS. 23A-D shows principle pressure distribution for real parts of third-order harmonics, from left to right: $Y_3^0$, $Y_3^1$, $Y_3^2$, and $Y_3^3$ (where θ direction has to be scaled by sin θ)
Figure 23B:
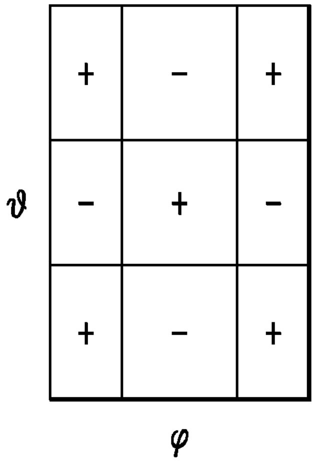
Figure 23C:
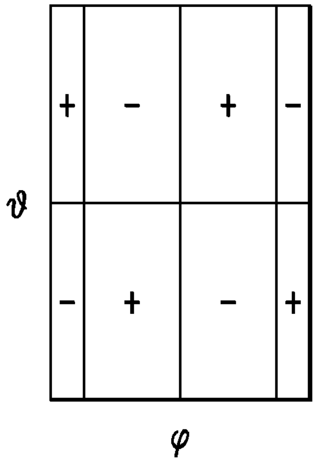
Figure 23D:
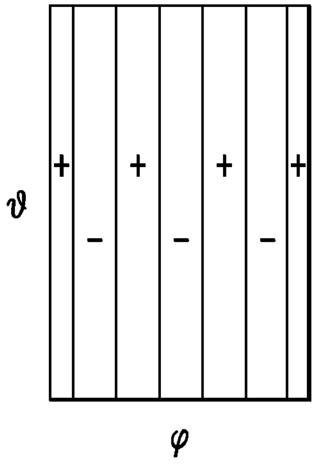

Equation (60) assumes an active microphone area from θ=0, . . . , $\theta_0$ and φ=0, . . . , 2π. $M_{nm}$ is the sensitivity to mode n,m. FIG. 22C indicates that the patch microphone has to have a significant size in order to attenuate the higher-order modes. In addition, the patch size has an upper limit, depending on the maximum order of interest. For example, for a system up to second order, a patch size of about 60° would be a good choice. All other modes would then be attenuated by at least a factor of about 2.5. Equation (69) allows the analysis of modes only with m=0. Unfortunately, if a different patch shape or different patch location is chosen, a general closed-form solution is difficult, if not impossible. Therefore, only numerical solutions are presented in the following section.

Array of Finite-Sized Sensors

Ideally, a spherical array that works in combination with the modal beamformer of FIG. 1 should satisfy the orthogonality constraint given by Equation (61) as follows:

$$\frac{4\pi}{S}\sum_{s=1}^{S} M_{nm}^{*}(s)Y_{n'}^{m'}(\vartheta_s, \varphi_s) = \delta_{n-n',m-m'} \quad (61)$$

Unfortunately, it is difficult if not impossible to solve this equation analytically. An alternative approach is to use common sense to come up with a sensor layout and then check if Equation (70) is (at least substantially) satisfied.

Figure 24:
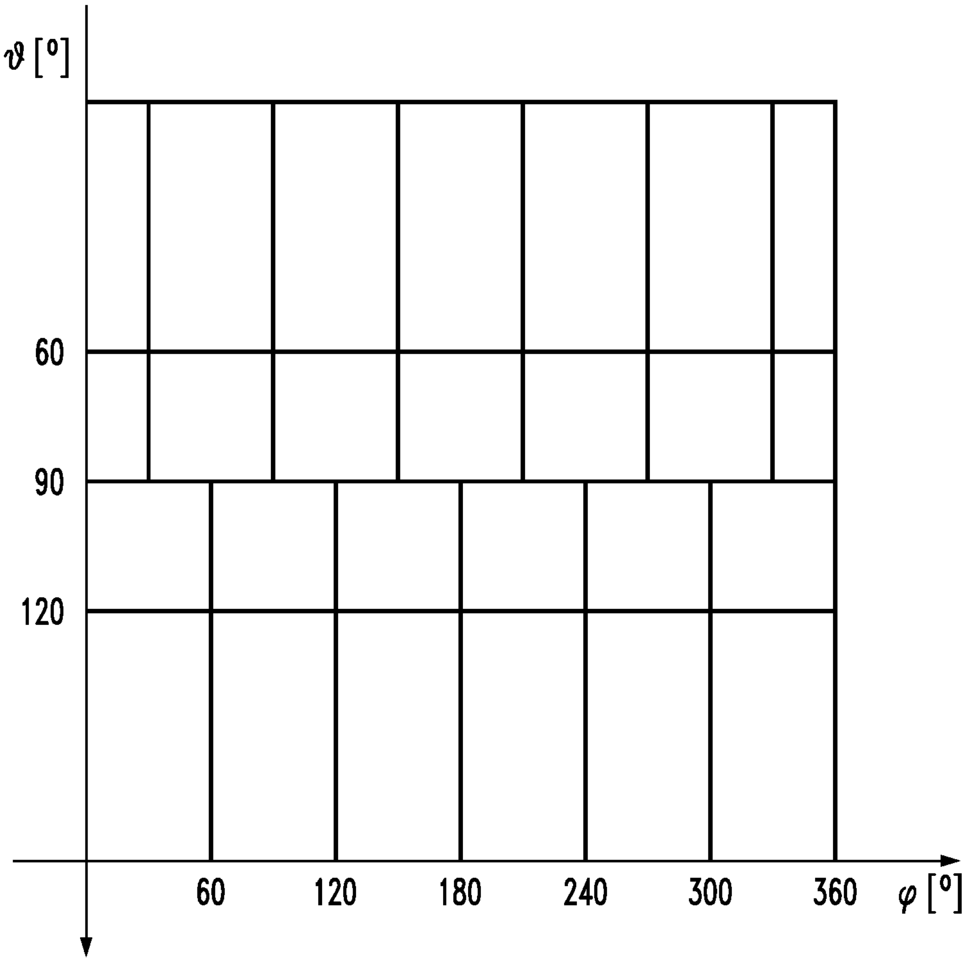
FIG. 24 shows a preferred patch microphone layout for a 24-element spherical array.

For a discrete spherical sensor array based on the 24-element "extended icosahedron" of Table 5, one issue relates to the choice of microphone shape. FIGS. 23A-D depict the basic pressure distributions of the spherical modes of third order, where the lines mark the zero crossings. For the other harmonics, the shapes look similar. These patterns suggest a rectangular shape for the patches to somehow achieve a good match between the patches and the modes. The patches should be fairly large. A good solution is probably to cover the whole spherical surface. Another consideration is the area size of the sensors. Intuitively, it seems reasonable to have all sensors of equal size. Putting all these arguments together yields the sensor layout depicted in FIG. 24, which satisfies the orthogonality constraint of Equation (70) up to third order. Although the layout in FIG. 24 does not appear to involve sensors of equal area, this is an artifact of projecting the 3-D curved shapes onto a 2-D rectilinear graph. Although there are still significant aliasing components from the fourth-order modes, the fifth-order modes are already significantly suppressed. As such, the fourth-order modes can be seen as a transition region.

Practical Implementation of Patch Microphones

This section describes a possible physical implementation of the spherical array using patch microphones. Since these microphones have almost arbitrary shape and follow the curvature of the sphere, patch microphones are preferred over conventional large-membrane microphones. Nevertheless, conventional large-membrane microphones are a good compromise since they have very good noise performance, they are a proven technology, and they are easier to handle.

One solution might come with a material called EMFi. See J. Lekkala and M. Paajanen, "EMFi—New electret material for sensors and actuators," *Proceedings of the* 10*th* *International Symposium on Electrets*, Delphi (IEEE, Piscataway, N.J., 1999), pp. 743-746, the teachings of which are incorporated herein by reference. EMFi is a charged cellular polymer that shows piezo-electric properties. The reported sensitivity of this material to air-borne sound is about 0.7 mV/Pa. The polymer is provided as a foil with a thickness of 70 μm. In order to use it as a microphone, metalization is applied on both sides of the foil, and the voltage between these electrodes is picked up. Since the material is a thin polymer, it can be glued directly onto the surface of the sphere. Also the shape of the sensor can be arbitrary. A problem might be encountered with the sensor self-noise. An equivalent noise level of about 50 dBA is reported for a sensor of size of 3.1 $cm^2$.

Figure 25:
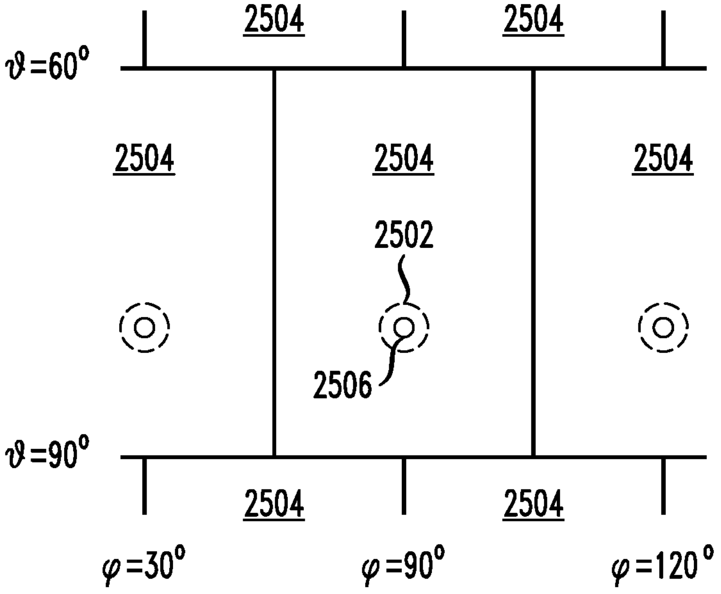
FIG. 25 illustrates an integrated microphone scheme involving standard electret microphone point sensors and patch sensors.

FIG. 25 illustrates an integrated scheme of standard electret microphone point sensors 2502 and patch sensors 2504 designed to reduce the noise problem. At low frequencies, signals from the point sensors are used. A low sensor self-noise is especially important at lower frequencies where the beampattern tends to be superdirectional. At higher frequencies, where the noise gain is due to the array, signals from the patch sensors are used. The patch sensors can be glued on the surface of the sphere on top of the standard microphone capsules. In that case, the patches should have only a small hole 2506 at the location of the point sensor capsule to allow sound to reach the membrane of the capsules.

Both arrays—the point sensor array and the patch sensor array—can be combined using a simple first- or second-order crossover network. The crossover frequency will depend on the array dimensions. For a 24-element array with a radius of 37.5 mm, a crossover frequency of 3 kHz could be chosen if all modes up to third order are to be used. The crossover frequency is a compromise between the WNG, the aliasing, and the order of the crossover network. Concerning the WNG, the patch sensor array should be used only if there is maximum WNG from the array (e.g., at about 5 kHz). However, at this frequency, spatial aliasing already starts to occur. Therefore, significant attenuation for the point sensor array is desired at 5 kHz. If it is desirable to keep the order of the crossover low (first or second order), the crossover frequency should be about 3 kHz.

Figure 26:
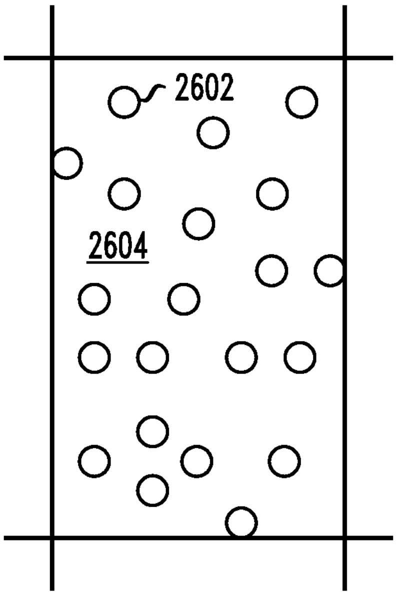
FIG. 26 illustrates a sampled patch microphone.

There are other ways to implement modal low-pass filters. For example, instead of using a continuous patch microphone, a "sampled patch microphone" can be used. As represented in FIG. 26, this involves taking several microphone capsules 2602 located within an effective patch area 2604 and combining their outputs, as described in U.S. Pat. No. 5,388,163, the teachings of which are incorporated herein by reference. Alternatively, a sampled patch microphone could be implemented using a number of individual electret microphones. Although this solution will also have an upper frequency limit, this limit can be designed to be outside the frequency range of interest. This solution will typically increase the number of sensors significantly. From Equation (61), in order to get twice the frequency range, four times as many microphones would be needed. However, since the signals within a sampled patch microphone are summed before being sampled, the number of channels that have to be processed remains unchanged. This would also extend the lower frequency range, since the noise performance of the sampled patches is 10 log($S_p$) better than the self-noise of a single sensor, where $S_p$ is the number of sensors per patch. This additional noise gain might allow omitting the microphone correction filters that are used to compensate for the differences between the microphone capsules. This would even simplify the processing of the microphone signals.

Alternative Approaches to Overcome Spatial Aliasing

The previous sections describe the use of patch sensors or sampled patch sensors to address the spatial aliasing problem. Although from a technical point of view, this is an optimal solution, it might cause problems in the implementation. These problems relate to either the difficulty involved in building the patch sensors for a continuous patch solution or the possibly large number of sensors for the sampled patch solution. This section describes two other approaches: (a) using nested spherical arrays and (b) exploiting the natural diffraction of the sphere.

Figure 26A:
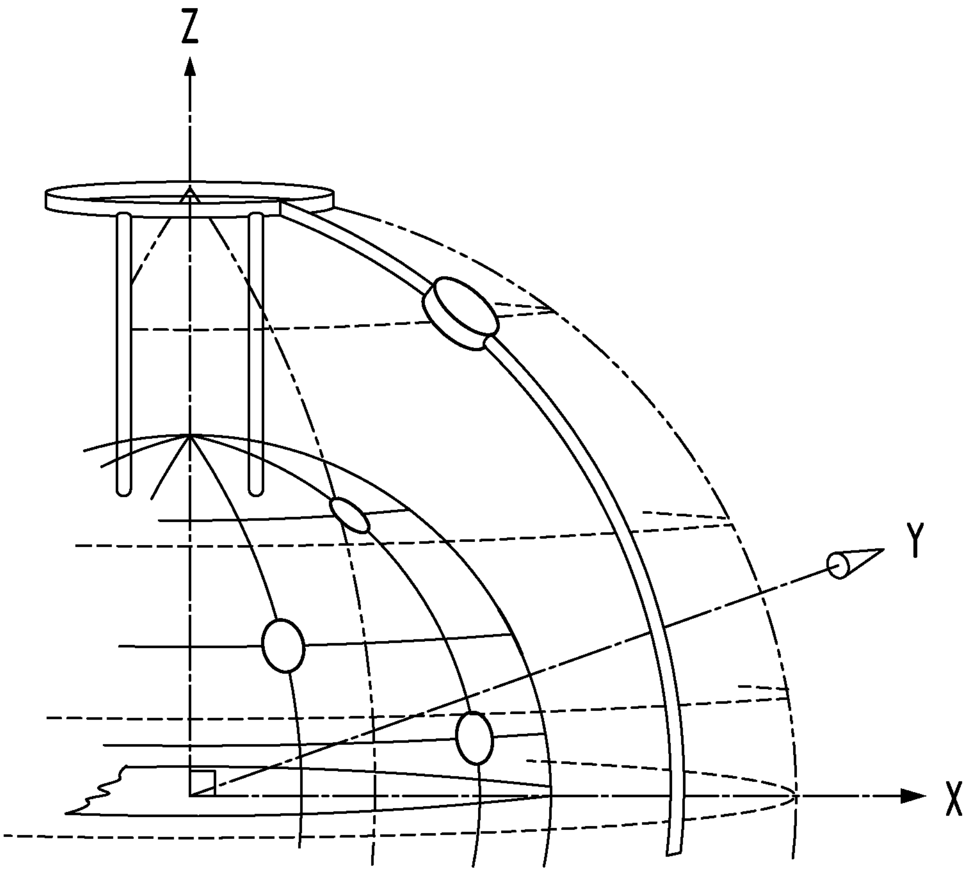
FIG. 26A illustrates a sensor mounted at an elevated position over the surface of a (partially depicted) sphere.

In FIG. 2, for example, one sensor array covered the whole frequency band. It is also possible to use two or more sensor arrays, e.g., staged on concentric spheres, where the outer arrays are located on soft, "virtual" spheres, elevated over the sphere located at the center, which itself could be either a hard sphere or a soft sphere. FIG. 26A gives an idea of how this array can be implemented. For simplicity, FIG. 26A shows only one sensor. The sensors of different spheres do not necessarily have to be located at the same spherical coordinates θ, ϕ. Only the innermost array can be on the surface of a sphere. The outermost sphere, having the largest radius, would cover the lower frequency band, while the innermost array covers the highest frequencies. The outputs of the individual arrays would be combined using a simple (e.g., passive) crossover network. Assuming the number of microphones is the same for all arrays (this does not necessarily need to be the case), the smaller the radius, the smaller the distance between microphones and the higher the upper frequency limit before spatial aliasing occurs.

A particularly efficient implementation is possible if all of the sensor arrays have their sensors located at the same set of spherical coordinates. In this case, instead of using a different beamformer for each different array, a single beamformer can be used for all of the arrays, where the signals from the different arrays are combined, e.g., using a crossover network, before the signals are fed into the beamformer. As such, the overall number of input channels can be the same as for a single-array embodiment having the same number of sensors per array.

Figure 26B:
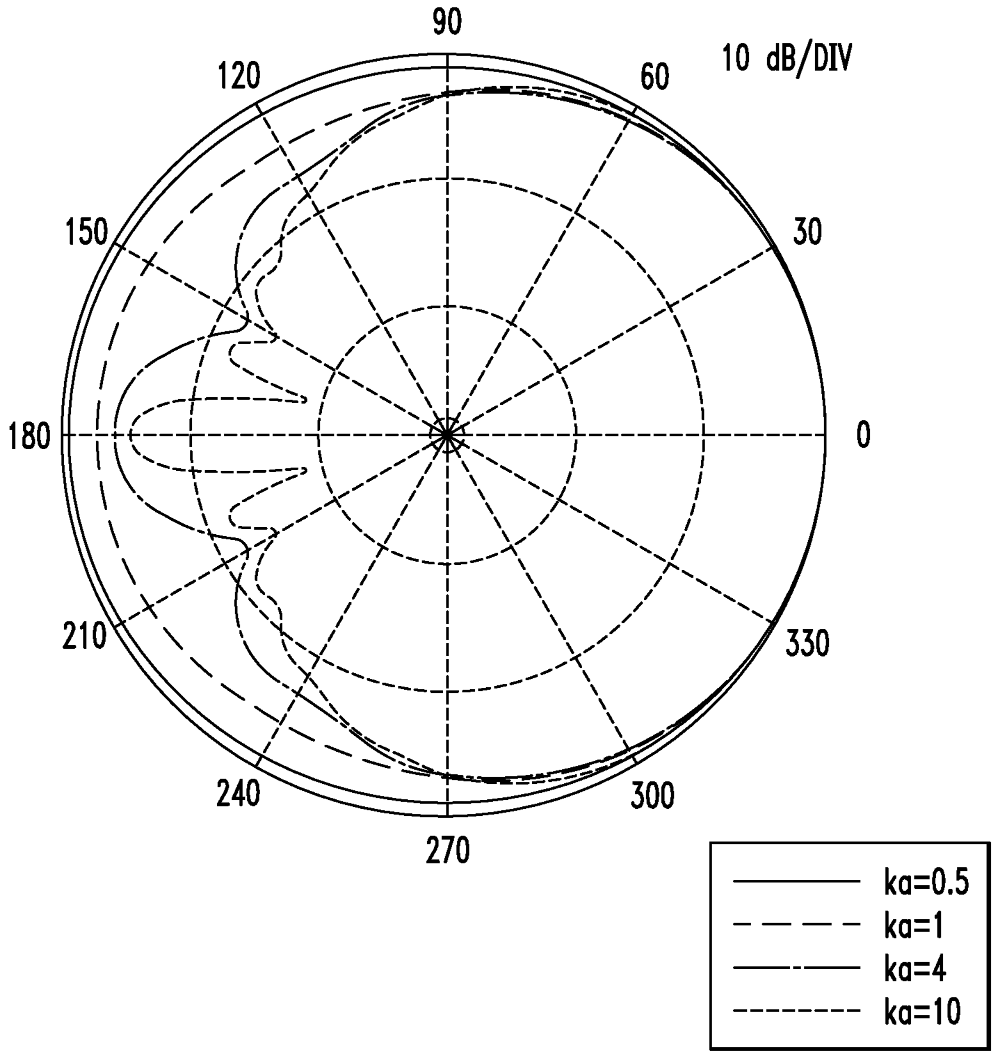
FIG. 26B graphically illustrates the directivity due to the natural diffraction of a rigid sphere for a pressure sensor mounted on the surface of a sphere at $\phi=0$.

According to another approach, instead of using the entire sensor array to cover the high frequencies, fewer than all—and as few as just a single one—of the sensors in the array could be used for high frequencies. In a single-sensor implementation, it would be preferable to use the microphone closest to the desired steering angle. This approach exploits the directivity introduced by the natural diffraction of the sphere. For a rigid sphere, this is given by Equation 6. FIG. 26B shows the resulting directivity pattern for a pressure sensor on the surface of a sphere (r=a). For an array using this property, the lower frequency signal would be processed by the entire sensor array, while the higher frequency band would be recorded with just one or a few microphones pointing towards the desired direction. The two frequency bands can be combined by a simple crossover network.

Microphone Calibration Filters

Figure 27:
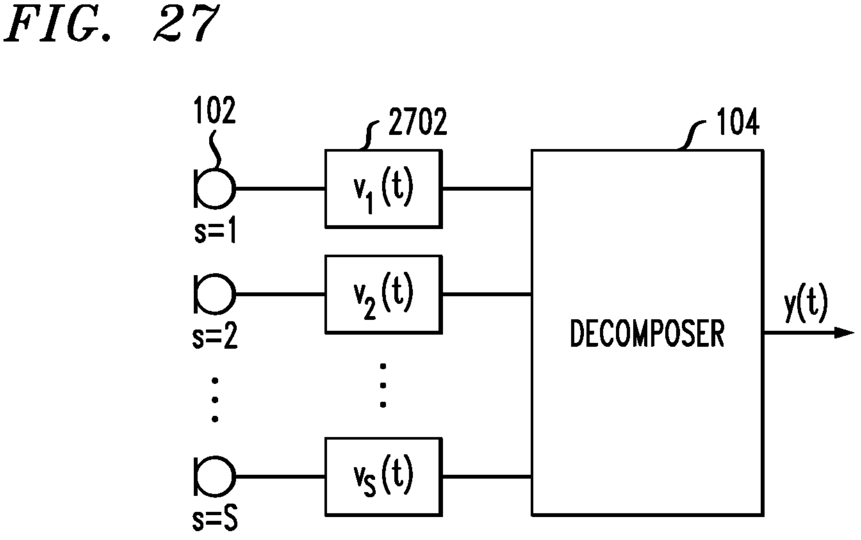
FIG. 27 shows a block diagram of a portion of the audio system of FIG. 1 according to an implementation in which an equalization filter is configured between each microphone and the modal decomposer.

As shown in FIG. 27, an equalization filter 2702 can be added between each microphone 102 and decomposer 104 of audio system 100 of FIG. 1 in order to compensate for microphone tolerances. Such a configuration enables beamformer 106 of FIG. 1 to be designed with a lower white noise gain. Each equalization filter 2702 has to be calibrated for the corresponding microphone 102. Conventionally, such calibration involves a measurement in an acoustically treaded enclosure, e.g., an anechoic chamber, which can be a cumbersome process.

Figure 28:
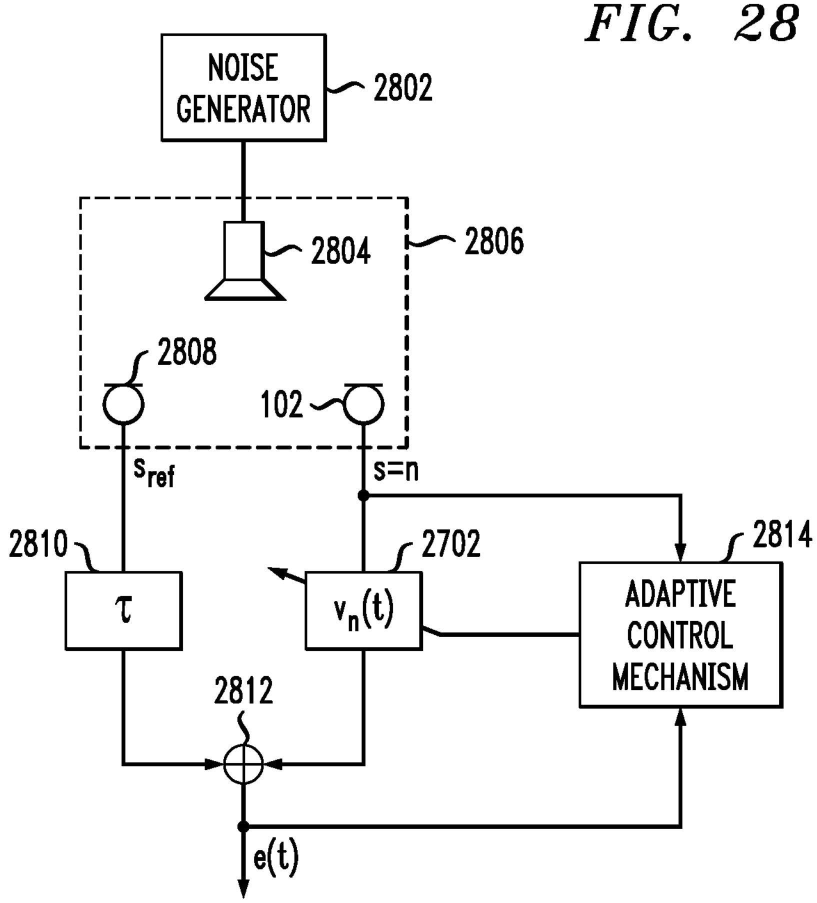
FIG. 28 shows a block diagram of the calibration method for the $n^{th}$ microphone equalization filter $v_n(t)$, according to one embodiment of the present invention.

FIG. 28 shows a block diagram of the calibration method for the $n^{th}$ microphone equalization filter $v_n(t)$, according to one embodiment of the present invention. As indicated in FIG. 28, a noise generator 2802 generates an audio signal that is converted into an acoustic measurement signal by a speaker 2804 inside a confined enclosure 2806, which also contains the $n^{th}$ microphone 102 and a reference microphone 2808. The audio signal generated by the $n^{th}$ microphone 102 is processed by equalization filter 2702, while the audio signal generated by reference microphone 2808 is delayed by delay element 2810 by an amount corresponding to a fraction (typically one half) of the processing time of equalization filter 2702. The respective resulting filtered and delayed signals are subtracted from one another at difference node 2812 to form an error signal e(t), which is fed back to adaptive control mechanism 2814. Control mechanism 2814 uses both the original audio signal from microphone 102 and the error signal e(t) to update one or more operating parameters in equalization filter 2702 in an attempt to minimize the magnitude of the error signal. Some standard adaption algorithm, like NLMS, can be used to do this.

Figure 29:
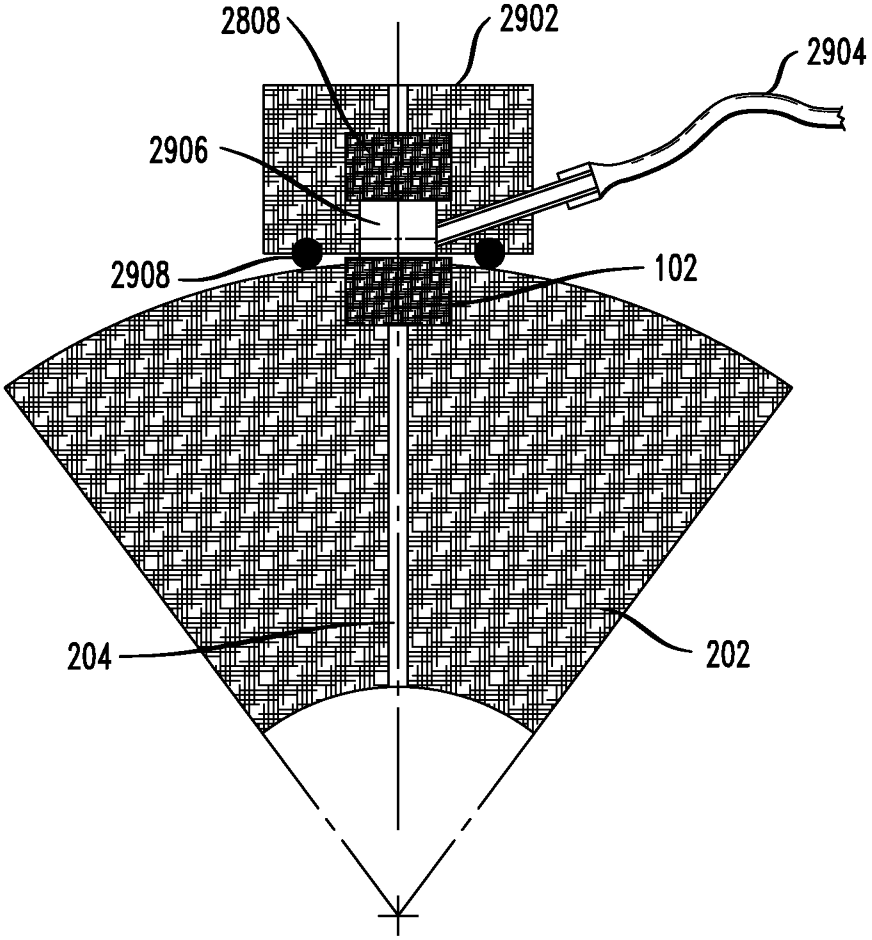
FIG. 29 shows a cross-sectional view of the calibration configuration of a calibration probe over an audio sensor of a spherical microphone array, such as the array of FIG. 2, according to one embodiment of the present invention.

FIG. 29 shows a cross-sectional view of the calibration configuration of a calibration probe 2902 over an audio sensor 102 of a spherical microphone array, such as array 200 of FIG. 2, according to one embodiment of the present invention. For simplicity, only one array sensor, with its corresponding canal 204 for wiring (not shown), is depicted in the sphere in FIG. 29. As shown in the figure, calibration probe 2902 has a hollow rubber tube 2904 configured to feed an acoustic measurement signal into an enclosure 2906 within calibration probe 2902. Reference sensor 2808 is permanently configured at one side of enclosure 2906, which is open at its opposite side. In operation, calibration probe 2902 is placed onto microphone array 200 with the open side of enclosure 2906 facing an audio sensor 102. The calibration probe preferably has a gasket 2908 (e.g., a rubber O-ring) in order to form an airtight seal between the calibration probe and the surface of the microphone array.

In order to produce a substantially constant sound pressure field, enclosure 2906 is kept as small as practicable (e.g., 180 $mm^3$), where the dimensions of the volume are preferably much less than the wavelength of the maximum desired measurement frequency. To keep the errors as low as possible for higher frequencies, enclosure 2906 should be built symmetrically. As such, enclosure 2906 is preferably cylindrical in shape, where reference sensor 2808 is configured at one end of the cylinder, and the open end of probe 2902 forms the other end of the cylinder.

The size of the microphones 102 used in array 200 determines the minimum diameter of cylindrical enclosure 2906. Since a perfect frequency response is not necessarily a goal, the same microphone type can be used for both the array and the reference sensor. This will result in relatively short equalization filters, since only slight variations are expected between microphones.

In order to position calibration probe 2902 precisely above the array sensor 102, some kind of indexing can be used on the array sphere. For example, the sphere can be configured with two little holes (not shown) on opposite sides of each sensor, which align with two small pins (not shown) on the probe to ensure proper positioning of the probe during calibration processing.

Calibration probe 2902 enables the sensors of a microphone array, like array 200 of FIG. 2, to be calibrated without requiring any other special tools and/or special acoustic rooms. As such, calibration probe 2902 enables in situ calibration of each audio sensor 102 in microphone array 200, which in turn enables efficient recalibration of the sensors from time to time.

Applications

Referring again to FIG. 1, the processing of the audio signals from the microphone array comprises two basic stages: decomposition and beamforming. Depending on the application, this signal processing can be implemented in different ways.

In one implementation, modal decomposer 104 and beamformer 106 are co-located and operate together in real time. In this case, the eigenbeam outputs generated by modal decomposer 104 are provided immediately to beamformer 106 for use in generating one or more auditory scenes in real time. The control of the beamformer can be performed on-site or remotely.

In another implementation, modal decomposer 104 and beamformer 106 both operate in real time, but are implemented in different (i.e., non-co-located) nodes. In this case, data corresponding to the eigenbeam outputs generated by modal decomposer 104, which is implemented at a first node, are transmitted (via wired and/or wireless connections) from the first node to one or more other remote nodes, within each of which a beamformer 106 is implemented to process the eigenbeam outputs recovered from the received data to generate one or more auditory scenes.

In yet another implementation, modal decomposer 104 and beamformer 106 do not both operate at the same time (i.e., beamformer 106 operates subsequent to modal decomposer 104). In this case, data corresponding to the eigenbeam outputs generated by modal decomposer 104 are stored, and, at some subsequent time, the data is retrieved and used to recover the eigenbeam outputs, which are then processed by one or more beamformers 106 to generate one or more auditory scenes. Depending on the application, the beamformers may be either co-located or non-co-located with the modal decomposer.

Each of these different implementations is represented generically in FIG. 1 by channels 114 through which the eigenbeam outputs generated by modal decomposer 104 are provided to beamformer 106. The exact implementation of channels 114 will then depend on the particular application. In FIG. 1, channels 114 are represented as a set of parallel streams of eigenbeam output data (i.e., one time-varying eigenbeam output for each eigenbeam in the spherical harmonic expansion for the microphone array).

In certain applications, a single beamformer, such as beamformer 106 of FIG. 1, is used to generate one output beam. In addition or alternatively, the eigenbeam outputs generated by modal decomposer 104 may be provided (either in real-time or non-real time, and either locally or remotely) to one or more additional beamformers, each of which is capable of independently generating one output beam from the set of eigenbeam outputs generated by decomposer 104.

This specification describes the theory behind a spherical microphone array that uses modal beamforming to form a desired spatial response to incoming sound waves. It has been shown that this approach brings many advantages over a "conventional" array. For example, (1) it provides a very good relation between maximum directivity and array dimensions (e.g., $DI_{max}$ of about 16 dB for a radius of the array of 5 cm); (2) it allows very accurate control over the beampattern; (3) the look direction can be steered to any angle in 3-D space; (4) a reasonable directivity can be achieved at low frequencies; and (5) the beampattern can be designed to be frequency-invariant over a wide frequency range.

This specification also proposes an implementation scheme for the beamformer, based on an orthogonal decomposition of the sound field. The computational costs of this beamformer are less expensive than for a comparable conventional filter-and-sum beamformer, yet yielding a higher flexibility. An algorithm is described to compute the filter weights for the beamformer to maximize the directivity index under a robustness constraint. The robustness constraint ensures that the beamformer can be applied to a real-world system, taking into account the sensor self-noise, the sensor mismatch, and the inaccuracy in the sensor locations. Based on the presented theory, the beamformer design can be adapted to optimization schemes other than maximum directivity index.

The spherical microphone array has great potential in the accurate recording of spatial sound fields where the intended application is for multichannel or surround playback. It should be noted that current home theatre playback systems have five or six channels. Currently, there are no standardized or generally accepted microphone-recording methods that are designed for these multichannel playback systems. Microphone systems that have been described in this specification can be used for accurate surround-sound recording. The systems also have the capability of supplying, with little extra computation, many more playback channels. The inherent simplicity of the beamformer also allows for a computationally efficient algorithm for real-time applications. The multiple channels of the orthogonal modal beams enable matrix decoding of these channels in a simple way that would allow easy tailoring of the audio output for any general loudspeaker playback system that includes monophonic up to in excess of sixteen channels (using up to third-order modal decomposition). Thus, the spherical microphone systems described here could be used for archival recording of spatial audio to allow for future playback systems with a larger number of loudspeakers than current surround audio systems in use today.

Although the present invention has been described primarily in the context of a microphone array comprising a plurality of audio sensors mounted on the surface of an acoustically rigid sphere, the present invention is not so limited. In reality, no physical structure is ever perfectly rigid or perfectly spherical, and the present invention should not be interpreted as having to be limited to such ideal structures. Moreover, the present invention can be implemented in the context of shapes other than spheres that support orthogonal harmonic expansion, such as "spheroidal" oblates and prolates, where, as used in this specification, the term "spheroidal" also covers spheres. In general, the present invention can be implemented for any shape that supports orthogonal harmonic expansion of order two or greater. It will also be understood that certain deviations from ideal shapes are expected and acceptable in real-world implementations. The same real-world considerations apply to satisfying the discrete orthonormality condition applied to the locations of the sensors. Although, in an ideal world, satisfaction of the condition corresponds to the mathematical delta function, in real-world implementations, certain deviations from this exact mathematical formula are expected and acceptable. Similar real-world principles also apply to the definitions of what constitutes an acoustically rigid or acoustically soft structure.

The present invention may be implemented as circuit-based processes, including possible implementation on a single integrated circuit. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the principle and scope of the invention as expressed in the following claims. Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

What is claimed is:

1. A machine-implemented method for processing audio signals, the method comprising:

(a) receiving a plurality of audio signals, each audio signal having been generated by a different sensor of a microphone array; and (b) decomposing the plurality of audio signals into a plurality of eigenbeam outputs, wherein:

each eigenbeam output corresponds to a different eigenbeam for the microphone array;

at least one of the eigenbeams has an order of two or greater;

the plurality of sensors in the microphone array are mounted on an acoustically rigid spheroid; and the positions of the sensors in the microphone array satisfy an orthonormality property given as follows:

$$\delta_{n-n',m-m'} \approx \frac{4\pi}{S}\sum_{s=1}^{S} Y_n^{m*}(p_s)Y_{n'}^{m'}(p_s),$$

wherein:

$\delta_{n-n',m-m'}$ equals 1 when n=n' and m=m', and 0 otherwise;

S is the number of sensors in the microphone array;

$p_s$ is position of sensor s in the microphone array;

$Y_{m'}^{m'}(p_s)$ is a spheroidal harmonic function of order n' and degree m' at position $p_s$; and $Y_n^{m*}(p_s)$ is a complex conjugate of the spheroidal harmonic function of order n and degree m at position $p_s$.

2. The method of claim 1, wherein each different sensor of the microphone array is a sampled patch microphone comprising a plurality of individual pressure sensors, wherein the audio signal generated by the sampled patch microphone is a sampled sum of analog signals generated by the plurality of the individual pressure sensors in the sampled patch microphone.

3. The method of claim 1, wherein each different sensor in the microphone array is a single conformal patch microphone.

4. The method of claim 1, wherein at least one of the eigenbeams has an order of at least three.

5. The method of claim 1, further comprising:

(c) generating an auditory scene based on the eigenbeam outputs.

6. The method of claim 5, wherein step (c) comprises:

(c1) applying a weighting value to each eigenbeam output to form a weighted eigenbeam; and (c2) combining the weighted eigenbeams to generate the auditory scene.

7. The method of claim 6, wherein step (c2) comprises:

(c2i) applying frequency-response corrections to the weighted eigenbeams to generate frequency-compensated beams; and (c2ii) summing the frequency-compensated beams to generate the auditory scene.

8. The method of claim 5, wherein step (c) comprises independently generating two or more different auditory scenes based on the eigenbeam outputs and their corresponding eigenbeams.

9. The method of claim 1, wherein the microphone array comprises the plurality of sensors mounted on an acoustically rigid sphere.

10. The method of claim 1, wherein:

the sensors are arranged in a spherical microphone array; and the orthonormality property is substantially given as follows:

$$\delta_{n-n',m-m'} \approx \frac{4\pi}{S}\sum_{s=1}^{S} Y_n^{m*}(\vartheta_s, \varphi_s)Y_{n'}^{m'}(\vartheta_s, \varphi_s),$$

wherein:

$(\theta_s, \phi_s)$ are spherical coordinate angles of sensor s in the microphone array;

$Y_{n'}^{m'}(\theta_s, \phi_s)$ is a spherical harmonic function of order n' and degree m' at the spherical coordinate angles $(\theta_s, \phi_s)$; and $Y_n^{m*}(\theta_s, \phi_s)$ is a complex conjugate of the spherical harmonic function of order n and degree m at the spherical coordinate angles $(\theta_s, \phi_s)$.

11. The method of claim 1, wherein step (b) further comprises treating each sensor signal as a directional beam for specified high frequency components in the audio signals.

12. The method of claim 1, wherein all of the sensors are used to process relatively low-frequency signals, while only a subset of the sensors are used to process relatively high-frequency signals.

13. A microphone, comprising a plurality of sensors mounted in an arrangement, wherein:

the plurality of sensors are mounted on an acoustically rigid spheroid;

the number and positions of sensors in the arrangement enable representation of a beampattern for the microphone as a series expansion involving at least one second-order eigenbeam; and the positions of the sensors in the microphone satisfy an orthonormality property given as follows:

$$\delta_{n-n',m-m'} \approx \frac{4\pi}{S}\sum_{s=1}^{S} Y_n^{m*}(p_s)Y_{n'}^{m'}(p_s),$$

wherein:

$\delta_{n-n',m-m'}$ equals 1 when n=n' and m=m', and 0 otherwise;

S is the number of sensors in the microphone array;

$p_s$ is position of sensor s in the microphone array;

$Y_{n'}^{m'}(p_s)$ is a spheroidal harmonic function of order n' and degree m' at position $p_s$; and $Y_n^{m*}(p_s)$ is a complex conjugate of the spheroidal harmonic function of order n and degree m at position $p_s$.

14. The microphone of claim 13, wherein each different sensor of the microphone array is a sampled patch microphone comprising a plurality of individual pressure sensors, wherein the audio signal generated by the sampled patch microphone is a sampled sum of analog signals generated by the plurality of the individual pressure sensors in the sampled patch microphone.

15. The microphone of claim 13, wherein each different sensor in the microphone array is a single conformal patch microphone.

16. The microphone of claim 13, wherein the series expansion involves an eigenbeam having order of at least three.

17. The microphone of claim 13, further comprising a processor configured to decompose a plurality of audio signals generated by the sensors into a plurality of eigenbeam outputs, wherein each eigenbeam output corresponds to a different eigenbeam for the microphone array and at least one of the eigenbeams has an order of two or greater.

18. The microphone of claim 17, wherein the processor is configured to generate an auditory scene based on the eigenbeam outputs.

19. The microphone of claim 18, wherein the processor is configured to:

apply a weighting value to each eigenbeam output to form a weighted eigenbeam; and combine the weighted eigenbeams to generate the auditory scene.

20. The microphone of claim 19, wherein the processor is configured to:

apply frequency-response corrections to the weighted eigenbeams to generate frequency-compensated beams; and sum the frequency-compensated beams to generate the auditory scene.

21. The microphone of claim 18, wherein the processor is configured to independently generate two or more different auditory scenes based on the eigenbeam outputs and their corresponding eigenbeams.

22. The microphone of claim 13, wherein the microphone array comprises the plurality of sensors mounted on an acoustically rigid sphere.

23. The microphone of claim 13, wherein:

the sensors are arranged in a spherical microphone array; and the orthonormality property is substantially given as follows:

$$\delta_{n-n',m-m'} \approx \frac{4\pi}{S}\sum_{s=1}^{S} Y_n^{m*}(\vartheta_s, \varphi_s)Y_{n'}^{m'}(\vartheta_s, \varphi_s),$$

wherein:

$(\theta_s, \phi_s)$ are spherical coordinate angles of sensor s in the microphone array;

$Y_{n'm'}(\theta_s, \phi_s)$ is a spherical harmonic function of order n' and degree m' at the spherical coordinate angles $(\theta_s, \phi_s)$; and $Y_n^{m*}(\theta_s, \phi_s)$ is a complex conjugate of the spherical harmonic function of order n and degree m at the spherical coordinate angles $(\theta_s, \phi_s)$.

24. Apparatus for processing audio signals, the apparatus comprising:

(a) means for receiving a plurality of audio signals, each audio signal having been generated by a different sensor of a microphone array; and (b) means for decomposing the plurality of audio signals into a plurality of eigenbeam outputs, wherein:

each eigenbeam output corresponds to a different eigenbeam for the microphone array;

at least one of the eigenbeams has an order of two or greater;

the plurality of sensors in the microphone array are mounted on an acoustically rigid spheroid; and the positions of the sensors in the microphone array satisfy an orthonormality property given as follows:

$$\delta_{n-n',m-m'} \approx \frac{4\pi}{S}\sum_{s=1}^{S} Y_n^{m*}(p_s)Y_{n'}^{m'}(p_s),$$

wherein:

$\delta_{n-n',m-m'}$ equals 1 when n=n' and m=m', and 0 otherwise;

S is the number of sensors in the microphone array;

$p_s$ is position of sensor s in the microphone array;

$Y_{n'}^{m'}(p_s)$ is a spheroidal harmonic function of order n' and degree m' at position $p_s$; and $Y_n^{m*}(p_s)$ is a complex conjugate of the spheroidal harmonic function of order n and degree m at position $p_s$.

* * * * *

UNITED STATES PATENT AND TRADEMARK OFFICE

CERTIFICATE OF CORRECTION

PATENT NO. : 8,433,075 B2
APPLICATION NO. : 12/501741
DATED : April 30, 2013
INVENTOR(S) : Gary W. Elko et al.

It is certified that error appears in the above-identified patent and that said Letters Patent is hereby corrected as shown below:

In the Claims:

In column 21, line 62, cancel the text beginning with “FIG. 19 represents” to and ending “Compensation Unit” in column 22, line 7 and insert the following:

-- Fig. 19 represents the structure of steering units, such as generic steering unit 1706 of Fig. 17 and second-order steering unit 108 of Fig. 1. Steering units are responsible for steering the look direction by [$\vartheta_0$, $\varphi_0$]. The mathematical description of the output of a steering unit for the $n^{th}$ order is given by Equation (55) as follows:

$$Y_n(\vartheta - \vartheta_0, \varphi - \varphi_0) =$$

$$\sum_{m=-n}^{n}\left(\sqrt{\frac{(n-m)!}{(n+m)!}}P_n^m(\cos(\vartheta_0))(\cos(m\varphi_0)\mathrm{Re}\{Y_n^m(\vartheta,\varphi)\} + \sin(m\varphi_0)\mathrm{Im}\{Y_n^m(\vartheta,\varphi)\})\right)$$

Compensation Unit --.

Signed and Sealed this
Thirteenth Day of August, 2013

Teresa Stanek Rea
*Acting Director of the United States Patent and Trademark Office*